US012550882B2

(12) United States Patent
Phelps et al.

(10) Patent No.: US 12,550,882 B2
(45) Date of Patent: Feb. 17, 2026

(54) GAME CALL FOR HANDS-FREE USE

(71) Applicant: MeatEater Holding Company, LLC, Bozeman, MT (US)

(72) Inventors: Jason G. Phelps, PeEll, WA (US); Abram W. Summerfield, Orofino, ID (US)

( * ) Notice: Subject to any disclaimer, the term of this patent is extended or adjusted under 35 U.S.C. 154(b) by 326 days.

(21) Appl. No.: 18/210,589

(22) Filed: Jun. 15, 2023

(65) Prior Publication Data

US 2023/0404061 A1 Dec. 21, 2023

Related U.S. Application Data

(60) Provisional application No. 63/352,928, filed on Jun. 16, 2022.

(51) Int. Cl.
*A01M 31/00* (2006.01)
(52) U.S. Cl.
CPC ................................ *A01M 31/004* (2013.01)
(58) Field of Classification Search
CPC .................................................... A01M 31/004
USPC ................... 446/202, 207, 208, 397
See application file for complete search history.

(56) References Cited

U.S. PATENT DOCUMENTS

| | | | | |
|---|---|---|---|---|
| 1,052,525 A * | 2/1913 | Smith | ................. | A01M 31/004 84/375 |
| 1,367,176 A * | 2/1921 | Bridges | .................... | A63H 5/00 446/202 |
| 2,584,549 A * | 2/1952 | Carhart | .................. | A63H 33/40 446/202 |
| 2,745,215 A * | 5/1956 | Puckette | ............ | A01M 31/004 446/202 |
| 3,738,056 A * | 6/1973 | Schultz | ............... | A01M 31/004 446/202 |
| 4,030,241 A * | 6/1977 | Gallagher | ........... | A01M 31/004 446/202 |
| 4,218,845 A * | 8/1980 | Evans | .................. | A01M 31/004 623/9 |
| 4,221,075 A * | 9/1980 | Gallagher | ........... | A01M 31/004 446/202 |
| 4,483,097 A * | 11/1984 | Piper | .................... | A01M 31/004 43/2 |
| 4,614,503 A * | 9/1986 | Skoda | ...................... | A63H 5/00 446/176 |

(Continued)

OTHER PUBLICATIONS

Assorted commercial game calls, available before May 2022.

*Primary Examiner* — Alexander R Niconovich
(74) *Attorney, Agent, or Firm* — Pedersen & Company, PLLC; Ken J. Pedersen; Barbara S. Pedersen

(57) ABSTRACT

An animal call for hands-free use may mimic a cow elk and attract both cow and bull elk. The call is inserted partially into the user's mouth, with an inner end inside the user's mouth between the user's front teeth, and with the outer end extending from the teeth and lips to be outside the user's mouth. The call may be operated by: 1) inhaling air into and through the call and into the user's mouth, for example, at various strengths/volumes, to create the call sound, and 2) changing the user's front teeth pressure against the housing to modify/modulate the sound to be realistic and life-like. Changes in the teeth pressure compress the game call body to various extents, pushing a tongue-like structure inside the call up to engage the diaphragm to various extents, thereby modifying and varying the sounds produced.

9 Claims, 34 Drawing Sheets

(56) References Cited

U.S. PATENT DOCUMENTS

| | | | | |
|---|---|---|---|---|
| 4,637,154 A * | 1/1987 | Laubach | A01M 31/06 | 446/202 |
| 4,752,270 A * | 6/1988 | Morton | A01M 31/004 | 84/2 |
| 4,761,149 A * | 8/1988 | Laubach | A01M 31/004 | 446/208 |
| 4,950,198 A * | 8/1990 | Repko, Jr. | A01M 31/004 | 446/209 |
| 5,061,220 A * | 10/1991 | Cooper | A01M 31/004 | 446/397 |
| 5,415,578 A * | 5/1995 | Jacobsen | A01M 31/06 | 446/397 |
| 5,735,725 A * | 4/1998 | Primos | A01M 31/004 | 446/202 |
| 5,785,574 A * | 7/1998 | Sears | A01M 31/004 | 446/397 |
| 5,885,125 A | 3/1999 | Primos | | |
| 6,039,627 A * | 3/2000 | Forbes | A01M 31/004 | 446/208 |
| 6,120,341 A * | 9/2000 | Hafford | A01M 31/004 | 446/202 |
| 6,179,684 B1 * | 1/2001 | Carlton | A01M 31/004 | 446/207 |
| 6,231,418 B1 * | 5/2001 | Hancock | A01M 31/004 | 446/397 |
| 6,435,933 B1 * | 8/2002 | Browne | A01M 31/004 | 446/397 |
| 6,572,430 B1 * | 6/2003 | Primos | A63H 5/00 | 446/202 |
| 6,612,894 B2 * | 9/2003 | Carlton | A01M 31/004 | 446/202 |
| 6,953,378 B1 * | 10/2005 | Finley, Jr. | A01M 31/004 | 446/207 |
| 7,011,564 B2 * | 3/2006 | Ady | A01M 31/004 | 446/209 |
| 7,037,167 B2 * | 5/2006 | Primos | A01M 31/004 | 446/204 |
| 7,553,210 B1 * | 6/2009 | Keller, Jr. | A01M 31/004 | 446/202 |
| 7,854,641 B2 * | 12/2010 | Koch, III | A01M 31/004 | 446/202 |
| 7,918,709 B1 * | 4/2011 | Primos | A01M 31/004 | 446/202 |
| 8,016,638 B1 * | 9/2011 | Kirby | A01M 31/004 | 446/202 |
| 8,870,620 B2 * | 10/2014 | McLeod | A01M 31/004 | 446/207 |
| 9,326,499 B1 * | 5/2016 | Gant | A01M 31/004 | |
| 9,554,571 B2 * | 1/2017 | Rouse | A01M 31/004 | |
| 9,622,467 B2 * | 4/2017 | Wiley | A01M 31/004 | |
| 10,172,344 B1 * | 1/2019 | Carlton | A01M 31/004 | |
| 10,194,651 B2 | 2/2019 | Rouse | | |
| 10,542,741 B2 | 1/2020 | Rouse | | |
| 12,185,716 B2 * | 1/2025 | Hendrickson | G10K 13/00 | |
| 2007/0155278 A1 * | 7/2007 | Burnett | A01M 31/004 | 446/209 |
| 2017/0181422 A1 * | 6/2017 | Reagan | A01M 31/004 | |
| 2017/0188568 A1 * | 7/2017 | Vaicunas | A01M 31/004 | |
| 2023/0292739 A1 * | 9/2023 | Ady | A01M 31/004 | 446/207 |

* cited by examiner

GAME CALL FOR HANDS-FREE USE

This application claims benefit of Provisional Application 63/352,928 filed Jun. 16, 2022, and entitled "Game Call for Hands-Free Use", the entire disclosure of which is incorporated herein by this reference.

BACKGROUND OF THE DISCLOSED TECHNOLOGY

Field of the Disclosed Technology

The invention relates to animal calls, for example, for the purposes of hunting or photography. The preferred embodiments relate more specifically to calls that may be used hands-free, by holding a portion of the call in the user's mouth and applying pressure with the user's teeth on the call to modulate/modify the sound emitted from the call. Certain preferred embodiments are for calling elk during hunting.

RELATED ART

Currently the only way to make quality game call sounds "hands-free" is to use a diaphragm call that fits entirely inside the user's mouth. One such diaphragm call is the AMP Diaphragm sold by Phelps Game Calls (https://phelpsgamecalls.com/products/amp-grey-elk-diaphragm), wherein a diaphragm unit is held in a flexible flap that is sized to fit inside the user's mouth so that the call may be generally centered in the mouth above the user's tongue. Then, the user may press upward on the diaphragm, with his/her tongue, during exhale-calling. Such conventional diaphragm calls have some associated difficulties for users:
1) they are difficult to learn and master; 2) people with a strong gag reflex will never be able to learn to use the call; and 3) all of the users' different mouth shapes and sizes create issues with fitting certain sizes of diaphragm calls to users.

Calls that are held outside the mouth and are blown into, for example similar to a horn, may be called "external calls" and have the shortcoming of needing to be hand-held to be operated. Hand-held calls create multiple issues, as the intent while calling-in animals is to have one's hands on the weapon or camera being used in the hunting or recreation. Also, hand-held calls create more movement and increase the chance of the user being seen and spooking the desired animal.

SUMMARY OF THE DISCLOSED TECHNOLOGY

The invention comprises an animal call that is especially well-adapted for hands-free use. Hands-free use is desirable, for example, when a user wants to keep his/her hands available to handle other equipment, such as a weapon or camera, and/or to minimize hand and arm movement to stay hidden from view of the animal. In certain embodiments, the call is an elk call and may be particularly effective for making sounds that mimic a cow elk in order to attract both cow and bull elk.

The call is installed in the user's mouth, with an inner end (proximal end) inside the user's mouth and the outer end (distal end) extending between the teeth and lips to be outside the user's mouth. The call is then operated by the user forcing air through the call, preferably by inhaling, to create sound and by the user adjusting/changing the force/pressure of his/her teeth against the housing to modify/modulate the sound to be realistic and life-like. Said adjusting/changing of the force may be done during a single inhaling of air or during multiple consecutive inhalings that are spaced apart by exhaling.

Thus, the call is held and operated hands-free by using the mouth and teeth, but is not entirely inside the mouth as are conventional diaphragm calls, whereby the call tends to be more comfortable and easier to use. Further, the preferred calls and use keep the diaphragm dry, compared to conventional diaphragm calls used entirely inside the user's mouth, by preventing the diaphragm from becoming covered by fluid from the mouth. This way, the diaphragm does not stick to the other internals of the call, and the "voice" of the call remains more "durable" and consistent, for more predictable use and higher quality sounds.

The preferred embodiments and methods are configured so that the user breaths in, or "sucks in", in order to pull air from the environment, through the call, and into his/her mouth and lungs. Thus, the preferred embodiments are "inhaling" calls, rather than "exhaling" calls, but certain alternative embodiments of the invention may use elements/features of the disclosed inhaling call to create an exhaling call.

The call comprises a reed-type member, preferably a flexible diaphragm, that moves/vibrates upon air being forced across the diaphragm, typically by the user inhaling to bring air into and through the longitudinal air passageway of the call, along the diaphragm, and to the middle or rear of the user's mouth. In certain embodiments, the diaphragm is provided in a diaphragm unit that comprises a frame that holds three edges of the diaphragm and leaves the fourth edge free. In certain embodiments, the diaphragm unit is installed in the call so that it is surrounded substantially by a housing/body, for example, by being inserted into a recess/cavity in a cassette and the cassette being inserted into the call body. This way, the diaphragm is held substantially or exactly parallel to the longitudinal axis of the call in the longitudinal air passageway of the call, nearer to the proximal end of the call than to the distal end of the call.

In certain embodiments, the call body is made of a flexible but resilient material, such as rubber or silicone. This way, the region of the body that houses the diaphragm unit may be flexed inward by the user applying compressive pressure with his/her upper and lower teeth to the top and bottom surfaces, respectively, of the call body, in preferred embodiments, at the proximal region of the call. This way, the lower interior surface of the call body is forced to move closer to, contact, and push-up against the diaphragm to modify/modulate the sound. In certain embodiments, the lower interior surface of the call body comprises an "artificial tongue" region that comprises curvature both longitudinally and transversely and that extends longitudinally from near the proximal opening of the call body, underneath the diaphragm, and distally at least part way to the distal opening of the call body. Therefore, the curved surface of the artificial tongue (hereafter, also "tongue") comes nearer to the diaphragm as the teeth apply pressure that, in effect, squeezes the call body vertically at the proximal end. As pressure is thus-applied to the call body by the teeth, certain portions of the preferred tongue surface contact and push/press-up on the diaphragm, to change the tones produced by the vibrating diaphragm.

Adjusting the applied pressure adjusts the contact and amount/distance that the tongue's curved surface presses-upward against the diaphragm, wherein this contact and pressing-upward are called the tongue's "engagement" with the diaphragm. Because of the tongue's curvature, the left and right regions of the tongue portion directly underneath the diaphragm, will contact and press-up the diaphragm in typical calling technique, while the central recessed region of the tongue portion directly underneath the diaphragm will typically not touch the diaphragm. This central recessed region under the diaphragm is a portion of the longitudinal recess or "trough" that extends longitudinally along all or substantially all of the tongue length. Therefore, with one end of the call comfortably received in the user's mouth, the user may quickly learn how to adjust pressure on that end of the call body to produce the desired tones by adjusting the amount of "bite" he/she performs on the call body. Said bite controls the tongue's engagement on the diaphragm, which, in turn, controls the stretch and resulting tautness of the diaphragm and the resulting tone/pitch of the sounds.

Certain embodiments may be configured to make little or no sound when there is little or no bite on the call body, that is, with the user inhaling while gently holding the call between the upper and lower teeth without compressing the call body. Certain other embodiments may be configured to make some sound when there is little or no bite on the call body. However, normal use of most embodiments involves a significant amount of bite, and the diaphragm is thereby pushed upwards significantly by the artificial tongue and therefore stretched significantly, for example, even to the extent that the diaphragm nearly touches the metal dome structure of the diaphragm unit. For example, the call may produce a low-pitched "OOOOO" sound when the diaphragm is relaxed (flat or nearly flat), and produce a high-pitched "EEEEE" sound when the diaphragm is substantially stretched, for example, to the maximum extent. Across this range of sounds, the amount of the tongue surface that contacts the diaphragm preferably stays the same or substantially the same, for example, the right and left regions of the tongue under the diaphragm on each side of the central recessed region of the longitudinal trough. However, the diaphragm tautness varies from relaxed to stretched-taut with increasing pushing-up/pressure on the diaphragm by these tongue regions.

The airflow direction on the preferred call is different from other external calls. Conventional external calls are operated by "breathing out" or "blowing out", whereas the present preferred call functions when the user inhales. Thus, in preferred embodiments of this disclosure, the air flows generally longitudinally inward through the air passageway of the call and to the user's mouth, rather than flowing outward to exit a "sound chamber" or "bell" as in conventional external calls. The present call's air passageway, which includes the tongue's longitudinal trough, ensures that the flowing air flows between the tongue and the diaphragm preferably with the flow direction being parallel or within a few degrees of parallel to the relaxed plane of the diaphragm. In other words, the air flows proximally from underneath the main plate of the cassette, between the bottom surface of the main plate and the distal lower inner surface of the call body, and continues to flow proximally across the bottom surface of the diaphragm via the central recessed region that is the portion of the tongue's longitudinal trough (TN) that is directly below the diaphragm. The resulting vibration of the diaphragm creates the call sounds, which may emanate out from the call body in all directions, including around the sides of the body, and also out from the ends of the call due to the call being generally open-ended. In certain embodiments, the call's sound tends to be more localized around the call and the user, compared to the "horn effect" of an exhaling call, and this localized" sound has been found to be very effective, because it tends to effectively let the animal that you are calling know your location.

Therefore, an object of certain embodiments of the disclosed technology is to allow a caller to be completely hands-free, for example, to shoot a weapon or camera of choice while operating the call. Another object of certain embodiments of the disclosed technology is to provide an animal or game call that is easy to use and that does not have the steep learning curve associated with other calls. Another object of certain embodiments of the disclosed technology is to allow the user to call with sound more realistic than all other options currently available, so that the sound excellently mimics the natural sounds of the animal. Certain embodiments meet one or more or all of these objects.

DETAILED DESCRIPTION OF CERTAIN EMBODIMENTS

Figure 1:
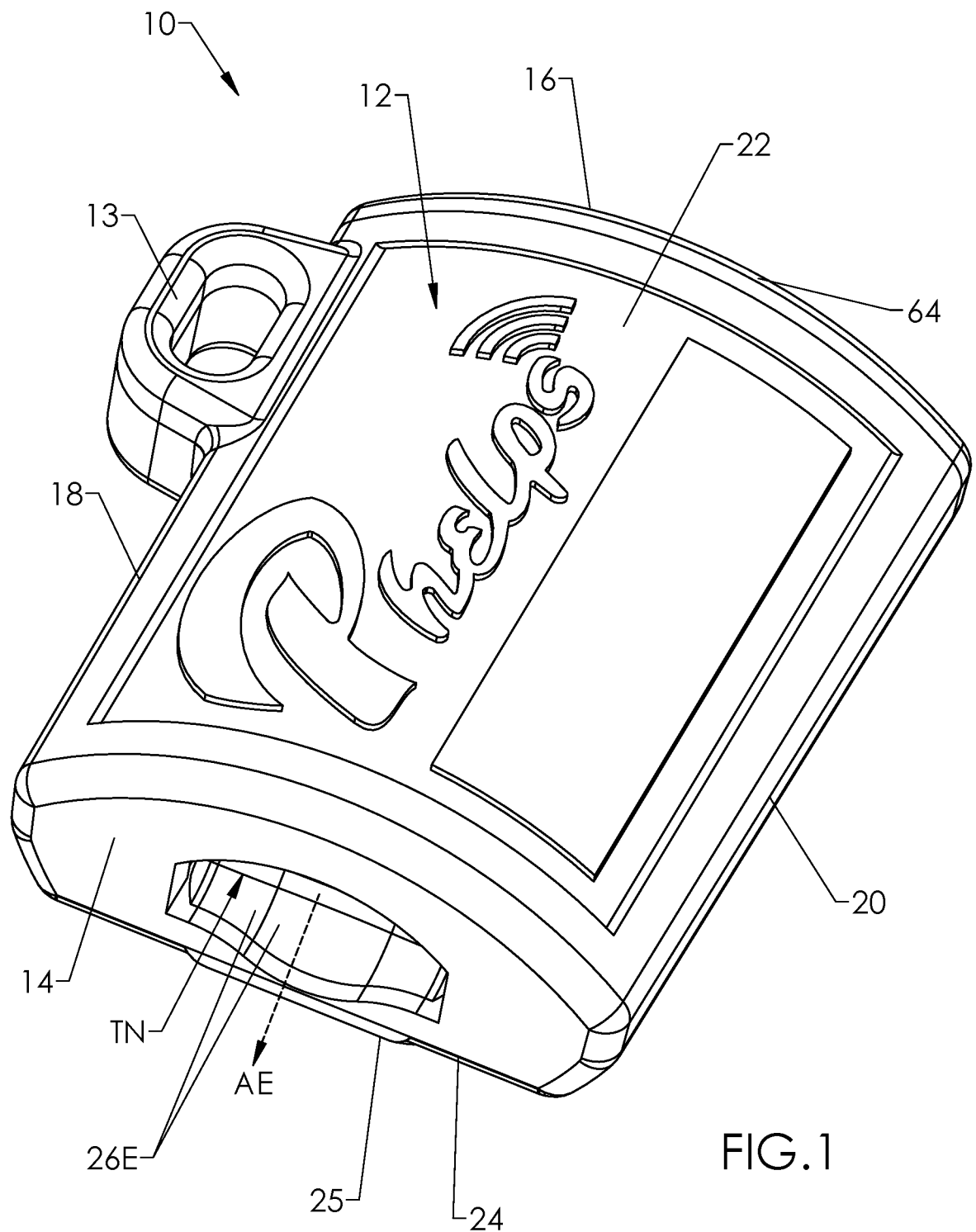
FIG. 1 is a top perspective view of one embodiment of the invented game call.
Figure 2:
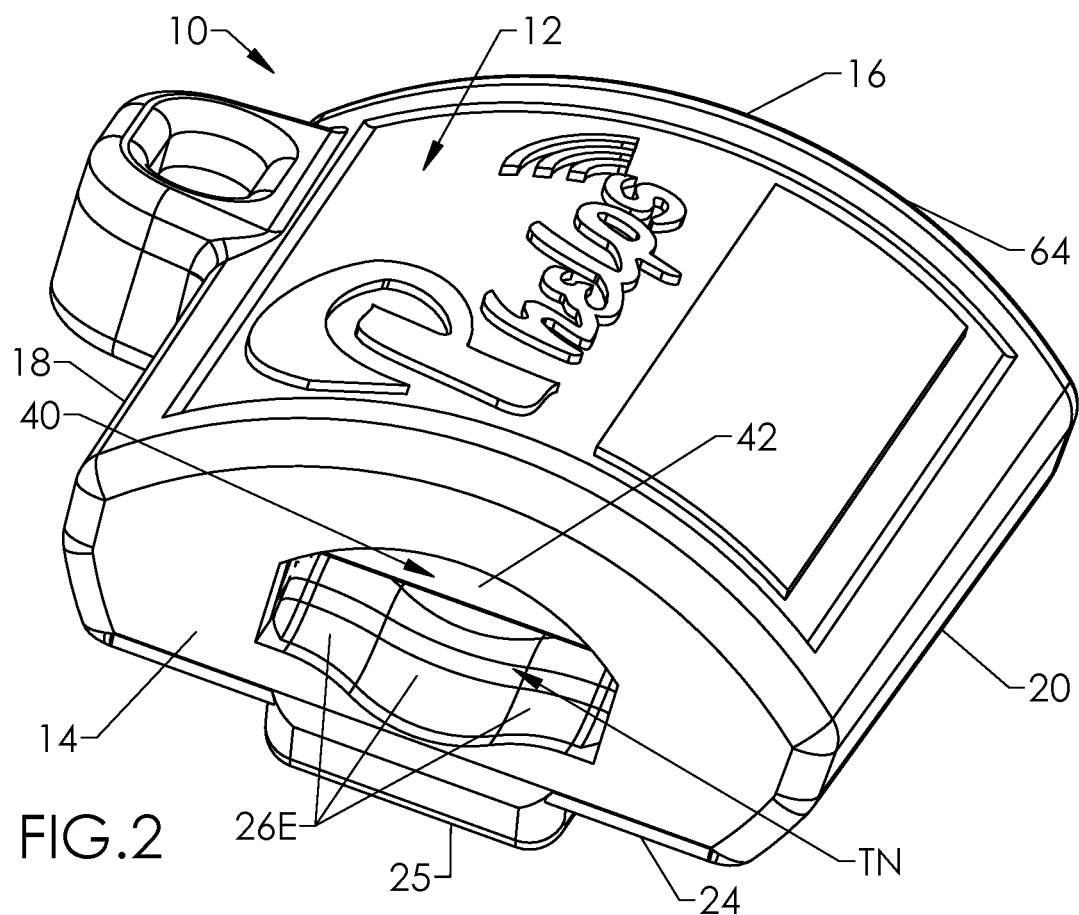
FIG. 2 is a top-proximal perspective view of the game call of FIG. 1.
Figure 3:
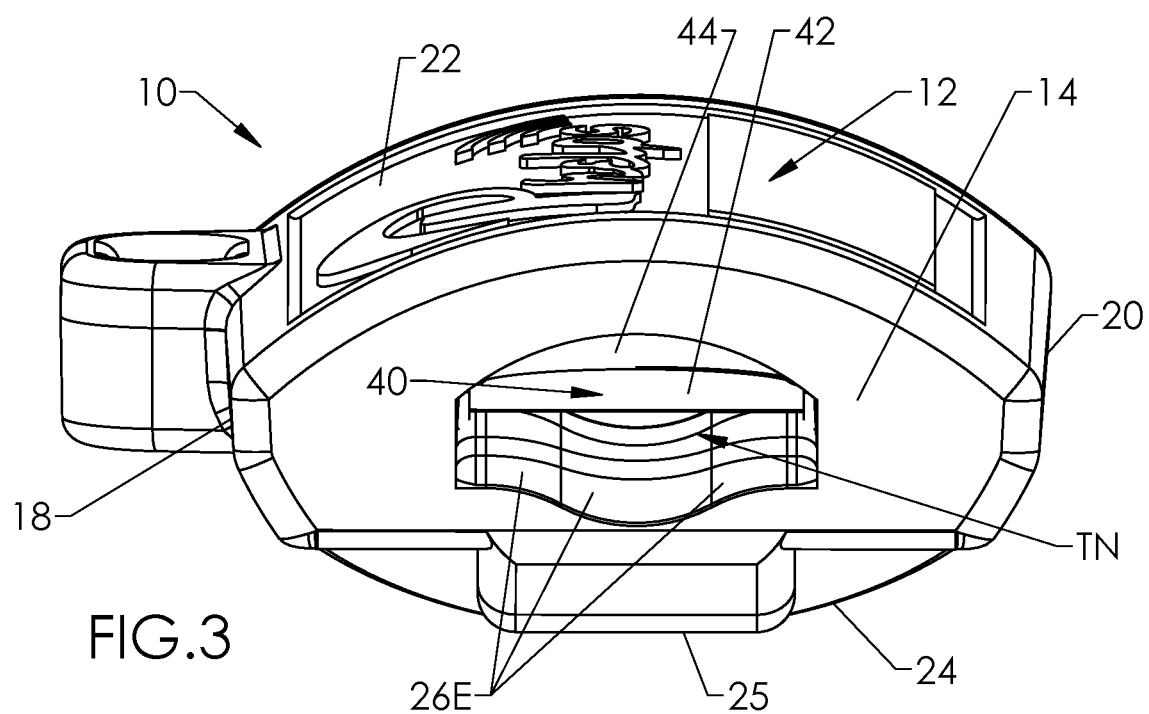
FIG. 3 is a proximal-end perspective view of the game call of FIG. 1.

Referring to the Figures, there are shown several, but not the only, embodiments of the disclosed technology. FIGS. 1-18C show a currently preferred embodiment (10) of the hands-free game call. FIGS. 19-30C show an alternative embodiment (110) of the hands-free game call that is smaller than the embodiment of FIGS. 1-18C, having a relatively short overall length and air passageway length. The embodiment of FIGS. 19-30C comprises certain elements that are the same or similar to those of the embodiment of FIGS. 1-18C, as will be apparent to the reader after viewing the drawings, and so those same or similar elements are labeled with reference numbers that are 100 numbers greater than those in the embodiment of FIGS. 1-18C; for example, the call body in embodiment 10 is labeled as "12" and the call body in embodiment 100 is labeled as "112". While certain embodiments may be sized differently, currently preferred embodiments are in the range of 1 to 3 inches long, and in the range of 1-1.5 inches wide, making the call small, compact and easy to hold and use substantially entirely inside the user's mouth.

Referring to FIGS. 1-18C:

In FIGS. 1-6: Game call 10 is an assembly of components comprising call body 12, a handle/cable holder 13, proximal end 14 of the call ("proximal" herein referring to the call end/portion that is toward the user and typically received in the user's mouth during use), distal end 16 of the call ("distal" herein referring to the call end/portion that is opposite the proximal end/portion and is away from user), left side 18 (toward the left side of the user), and right side 20 (toward the right side of the user), top side 22, bottom side 24 that has a downwardly-protruding platform 25, and an interior bottom surface portion that is curved in both the longitudinal (between distal and proximal ends) and the transverse (between right and left sides) directions and which may be called an "artificial tongue" or "tongue" TN due to its being specially-adapted for use in pressing upward on the diaphragm of the game call. The shape of certain embodiments of the tongue TN may be seen to best advantage in FIGS. 18A-C and 30A-C. The portion of the tongue TN that is at or near the proximal end 14 is labeled as 26E ("E" for "exit" due to the proximal end being the end of the call wherein the air typically exits, FIGS. 1-4) and the portion of the tongue TN that is at or near the distal end 16 is labeled 26I ("I" for "intake" due to the distal end being the end of the call wherein the air typically enters, FIG. 5).

Dashed-lined arrow AI ("air intake") indicates air flow from the environment into the distal end of the game call's internal air passageway AP and dashed-line arrow AE ("air exit") indicates air flow from the proximal end of the game call's internal air passageway AP to the user's mouth. The internal air passageway AP is schematically drawn through the game call or its components as dashed line arrow(s). Air passageway AP is shown extending through the entire call in FIG. 9A, through the cassette in FIG. 12, and through the cassette and underneath the diaphragm in FIG. 13.

In FIGS. 2, 3 4, 8-11, 13, 14, 14A, and 14B, portions of the preferred diaphragm unit 40 are shown. The diaphragm 42 may be described as acting as a reed for the game call by vibrating in the air stream of the internal air passageway AP to produce sounds. As will be described in more detail below, the diaphragm 42 is held in a frame 48 that is received in the cassette, wherein the frame 48 has a diaphragm unit arch 44 (or simply "diaphragm arch") with a proximal edge 43 extending over the diaphragm 42.

Figure 4:
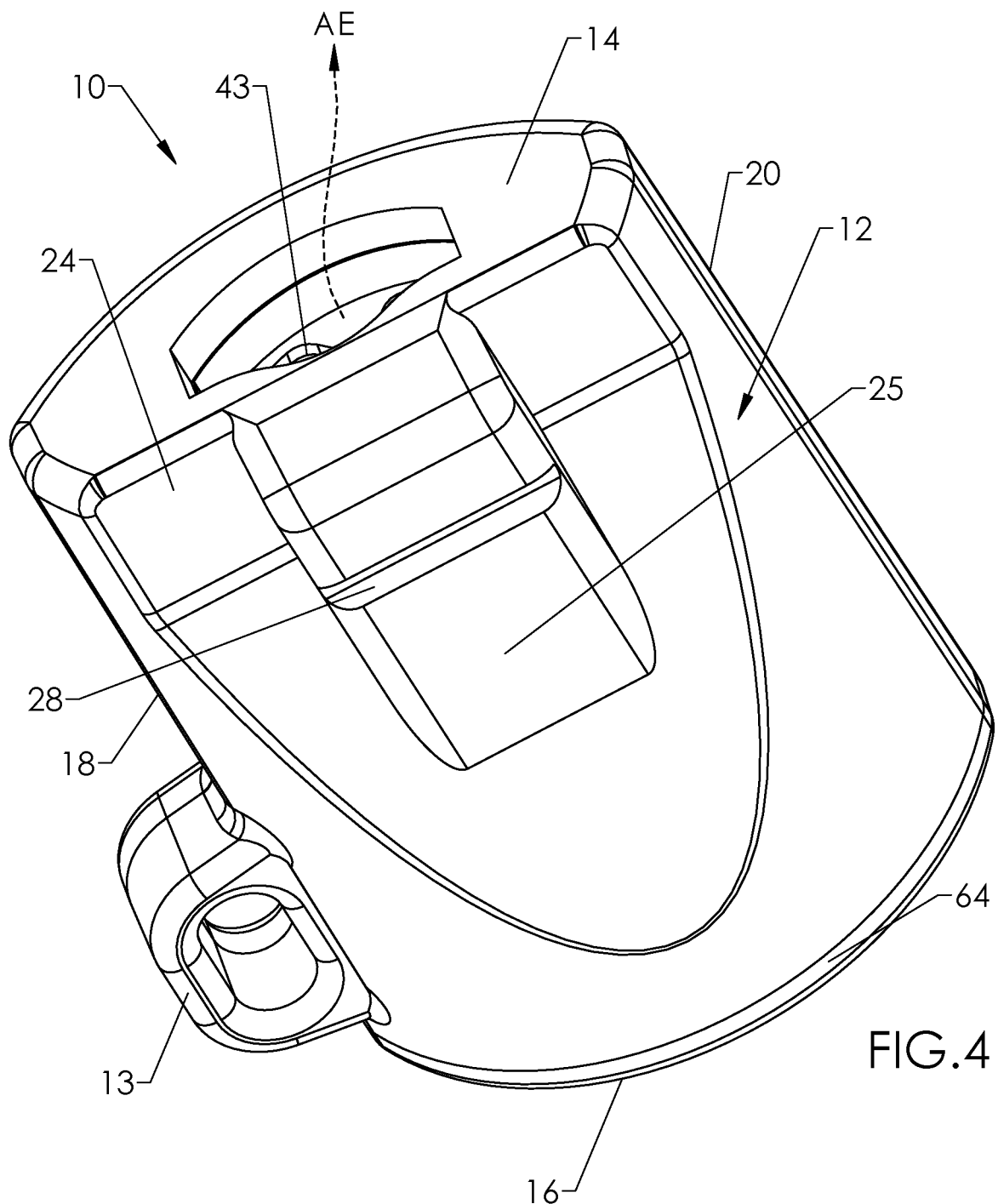
FIG. 4 is a bottom perspective view of the game call of FIG. 1.
Figure 5:
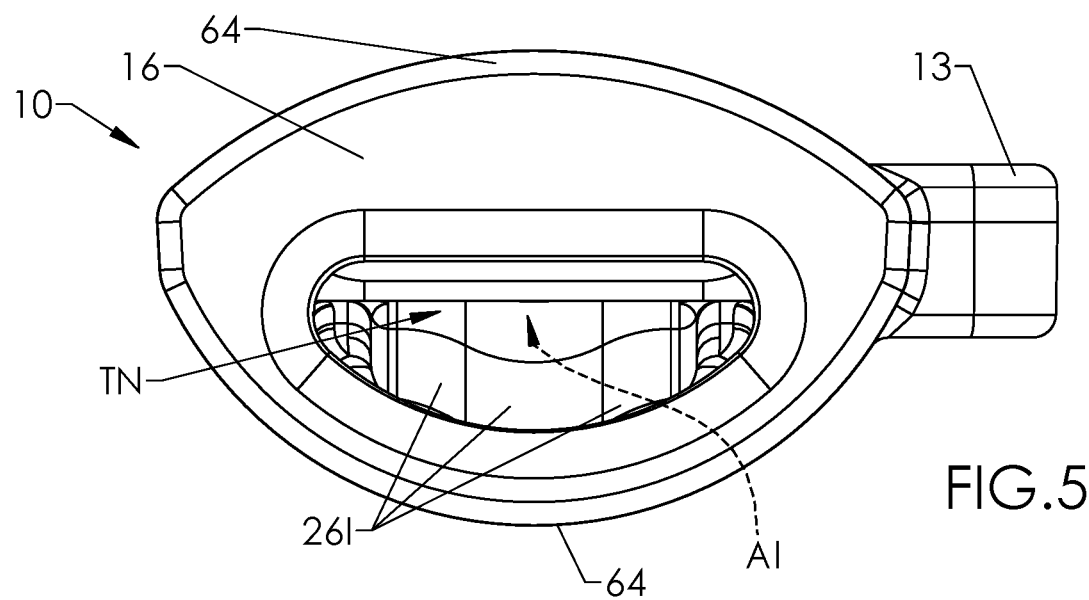
FIG. 5 is a distal end view of the game call of FIG. 1.
Figure 6:
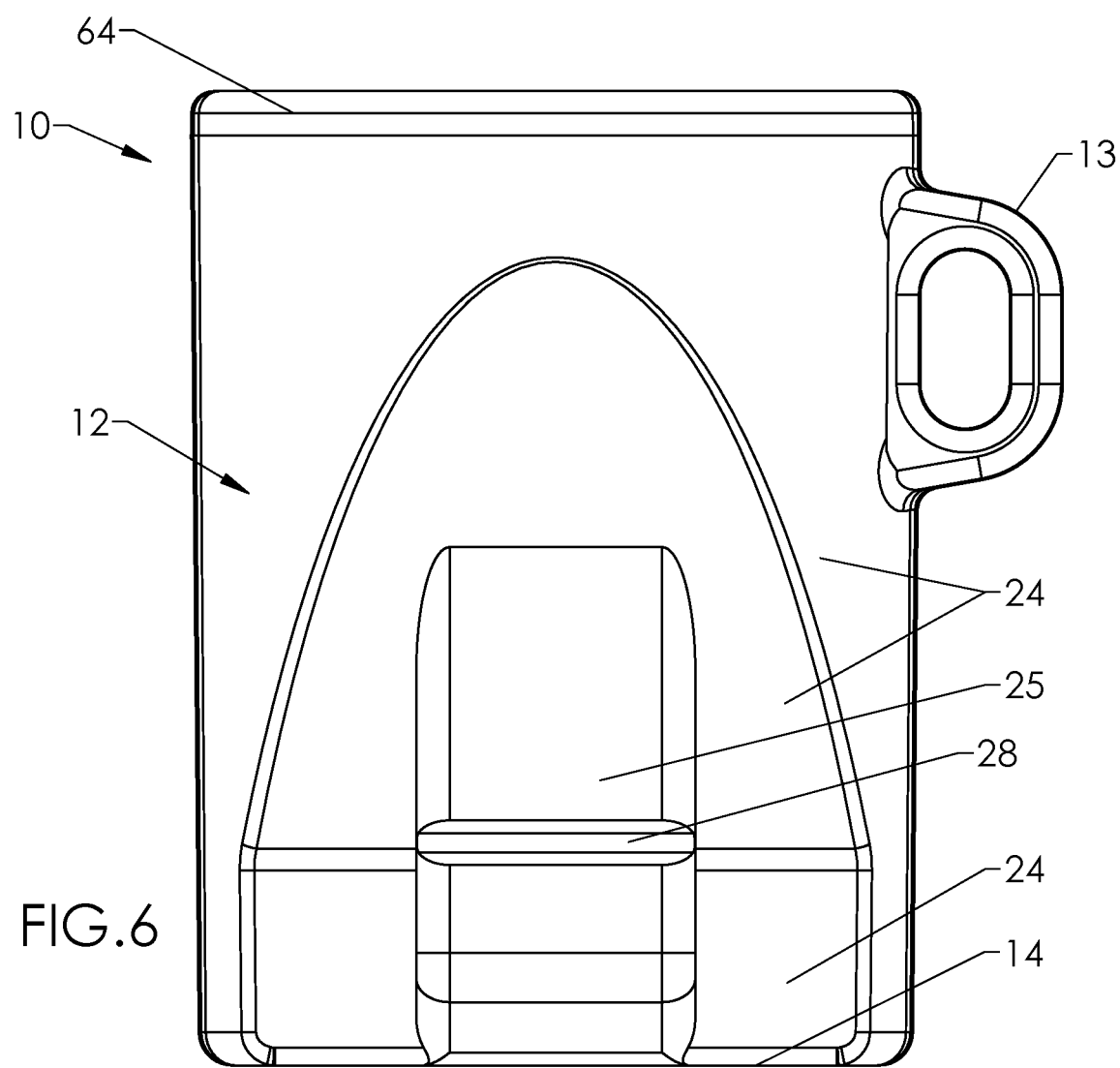
FIG. 6 is a bottom view of the game call of FIG. 1.

In FIGS. 4 and 6, a transverse notch 28 is shown in the protruding platform 25 of the bottom side 24 of the game call, wherein the notch 28 acts as a recess in which the user's bottom teeth rest and preferably remain during calling. This way, the teeth are at a consistent location each time on the bottom side 24 of the game call body 12, for repeatable and consistent "biting" or "clenching" of his/her teeth to various extents to modify/modulate the sounds from the game call. The game call body 12 is made of flexible, resilient material, for example, silicone or rubber. The body 12 forms the outside of the game call assembly, housing the cassette and the diaphragm unit, creating an air seal and acting as the artificial tongue that touches the latex. This way, none of the user's lips, teeth, tongue, or other portions of the mouth contact the cassette or diaphragm.

Figure 7:
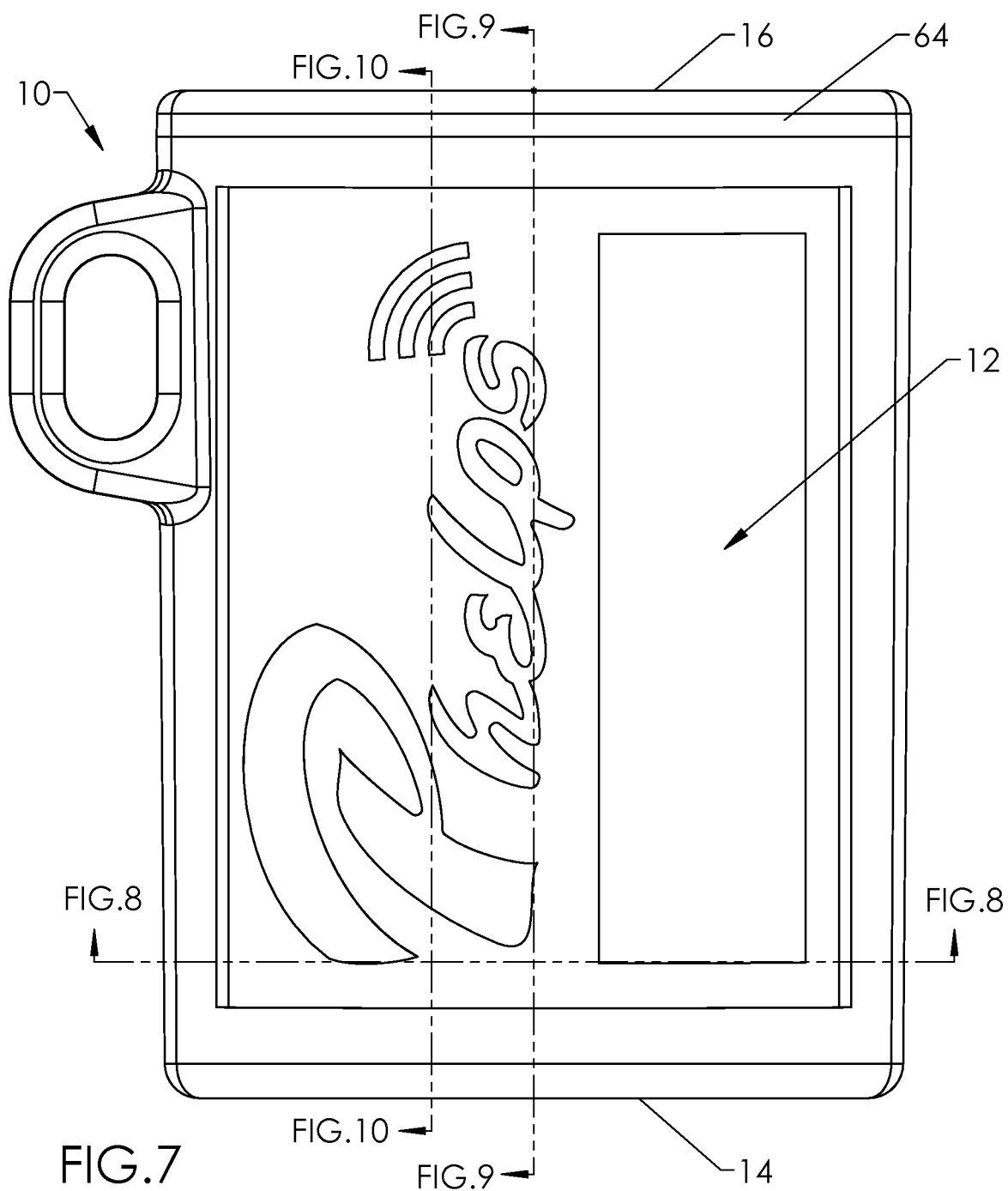
FIG. 7 is a top view of the game call of FIG. 1.
Figure 8:
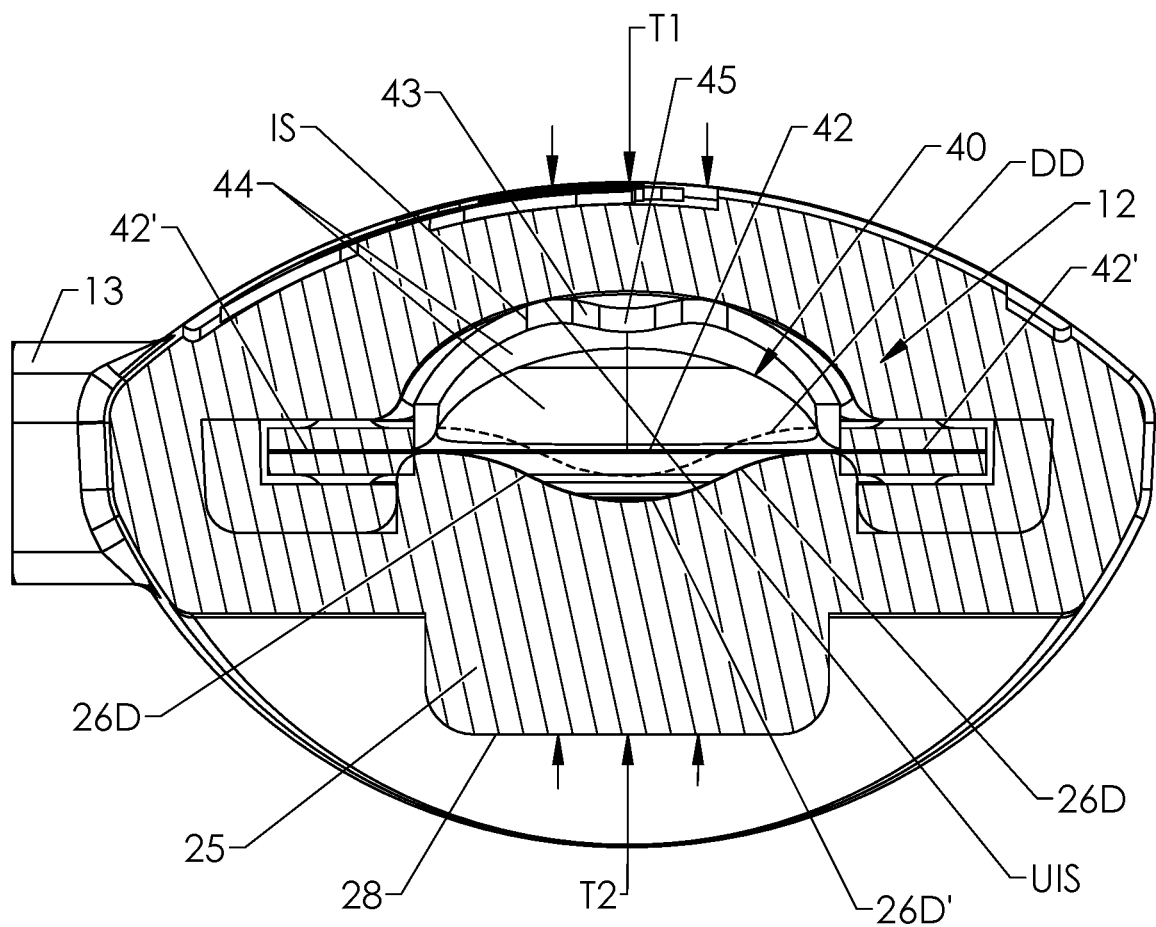
FIG. 8 is a cross-sectional view of the game call of FIG. 1 viewed along the line 8-8 in FIG. 7.
Figure 17:
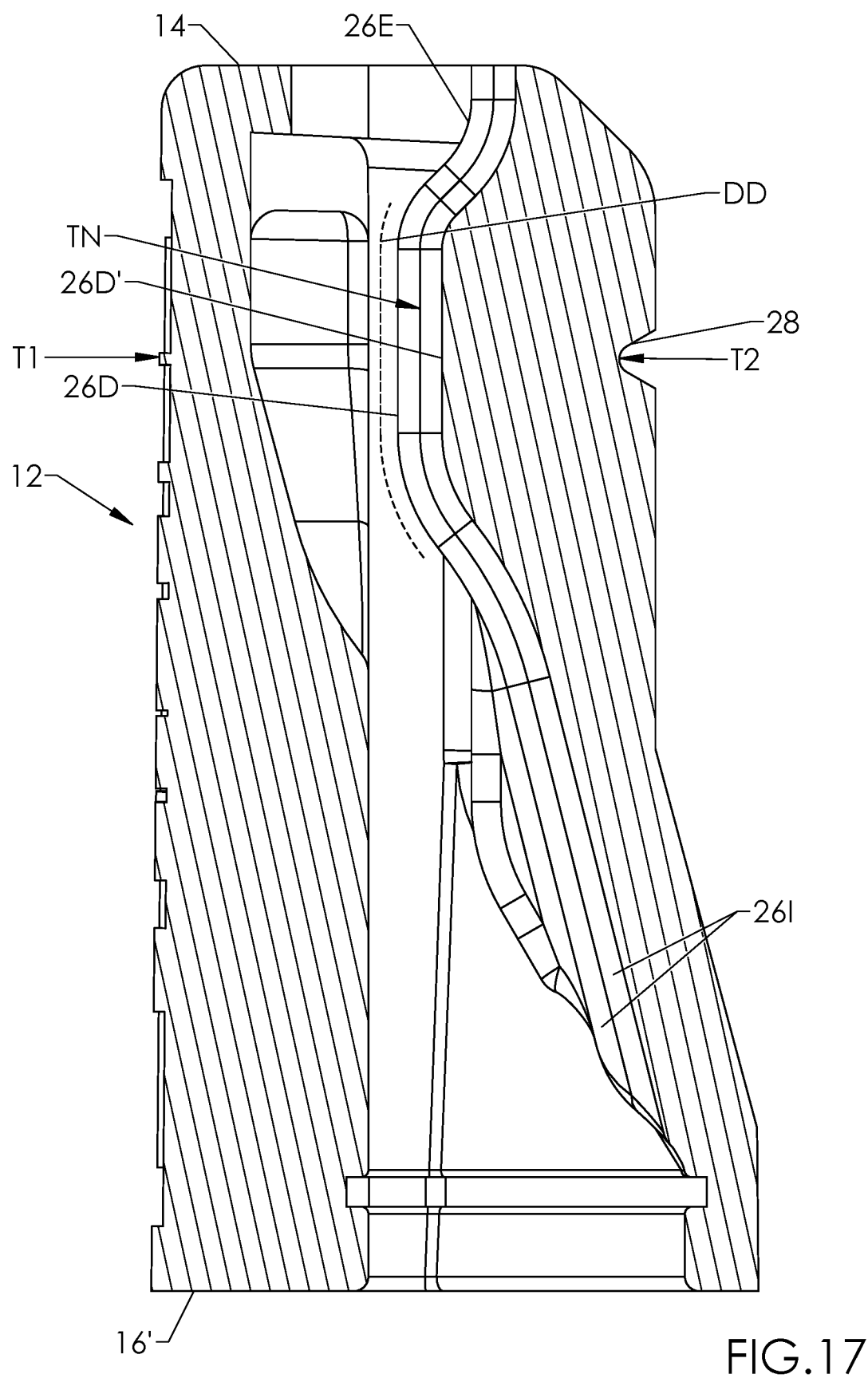
FIG. 17 is a cross-sectional view of the body of the game call of FIG. 11, viewed along the line 17-17 in FIG. 16.
Figure 17A:
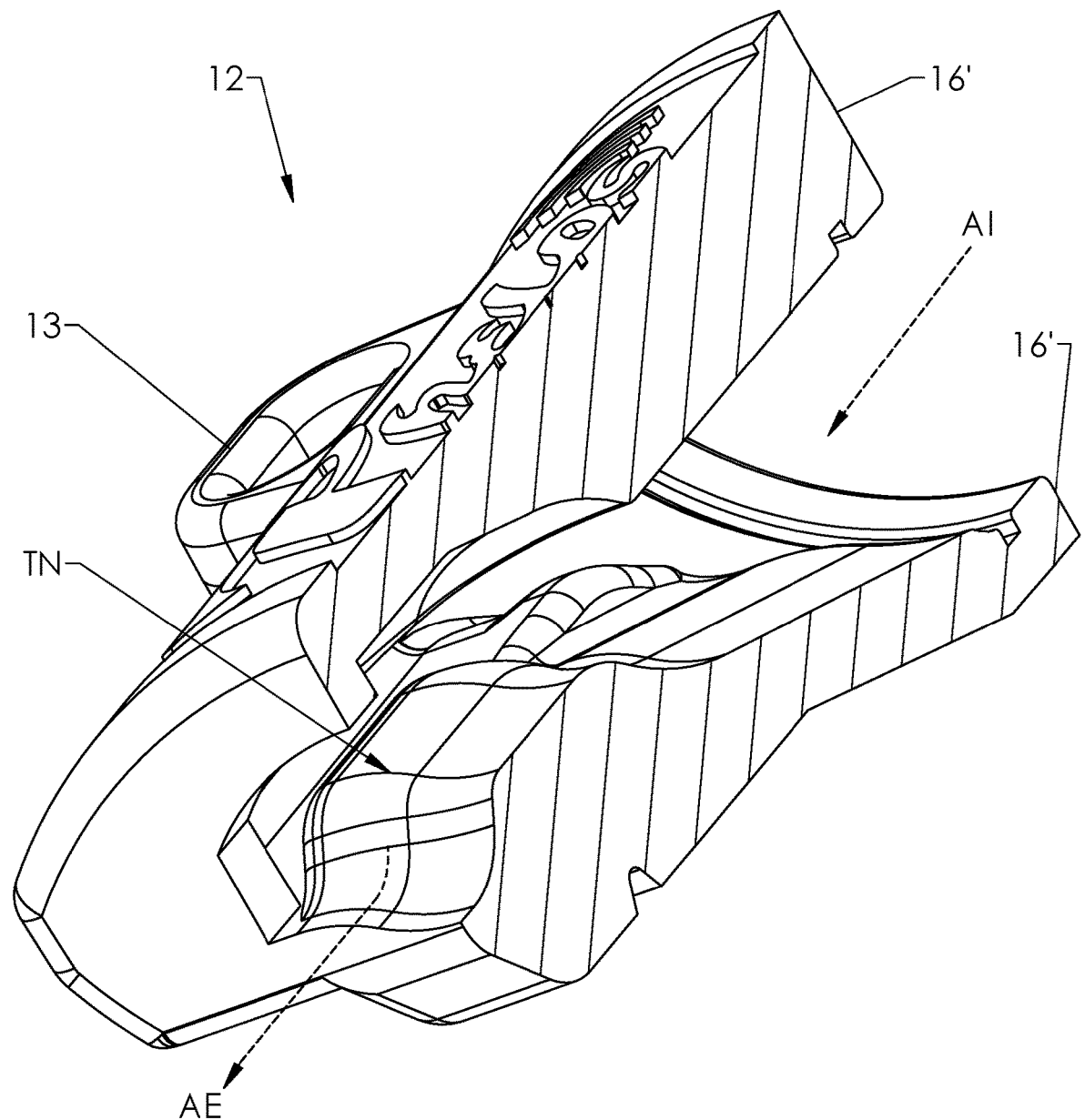
FIG. 17A is a cross-sectional view of the body of the game call of FIG. 11, viewed along the line 17A-17A in FIG. 16 except rotated slightly to be in perspective.
Figure 18:
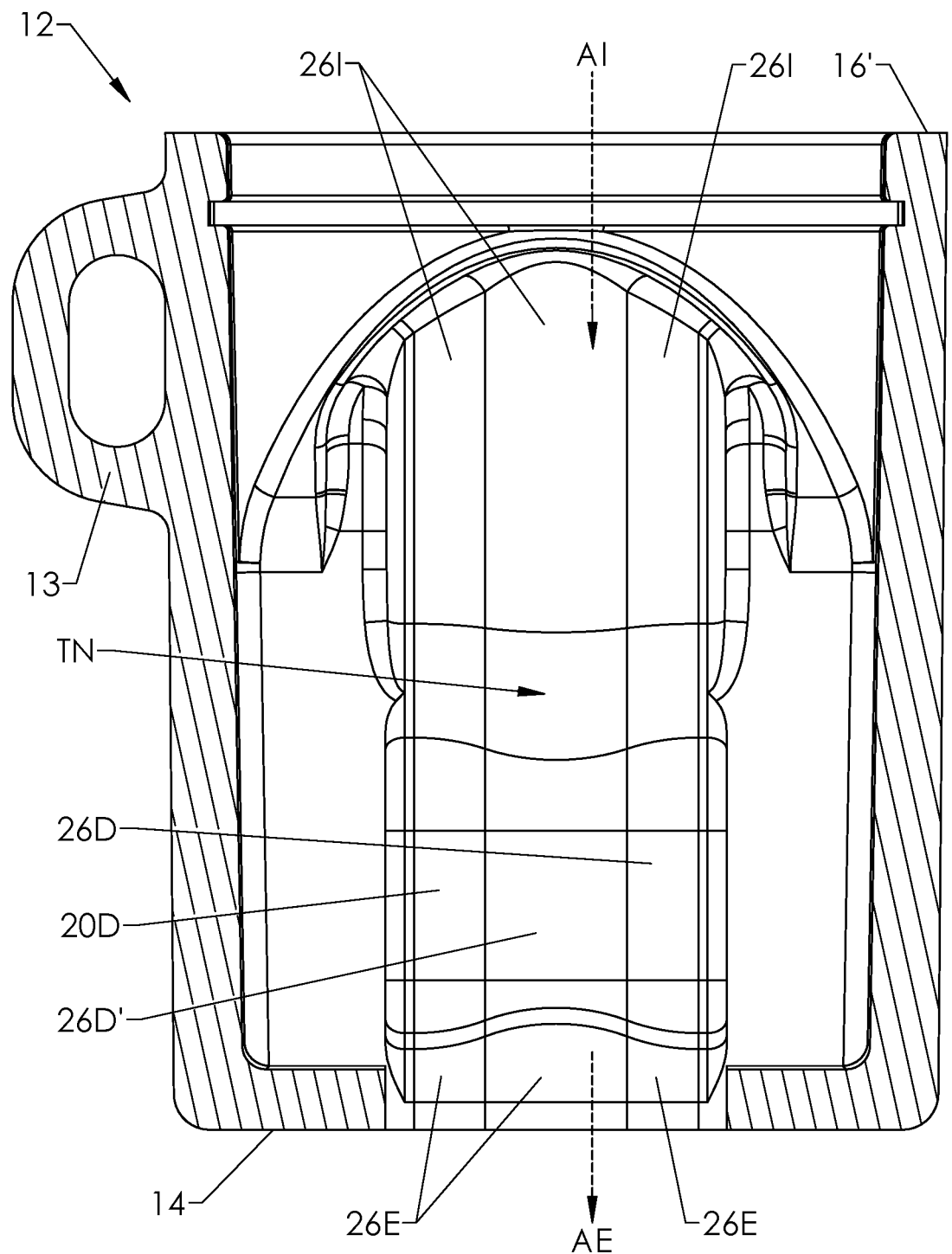
FIG. 18 is a cross-sectional view of the body of the game call of FIG. 1, viewed along the line 18-18 in FIG. 16.
Figure 18A:
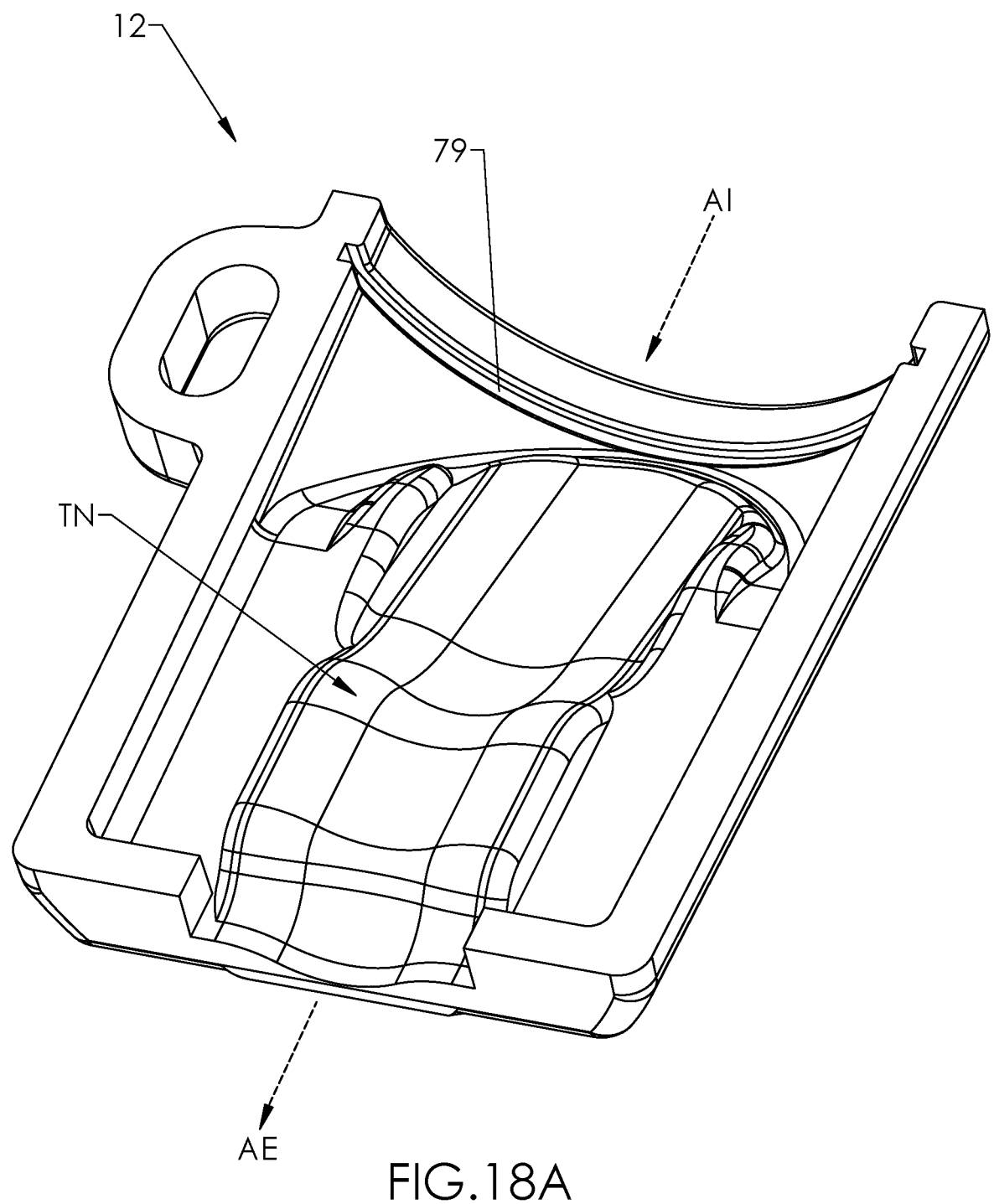
FIG. 18A is a cross-sectional view similar to FIG. 18, except rotated to be in perspective.
Figure 18B:
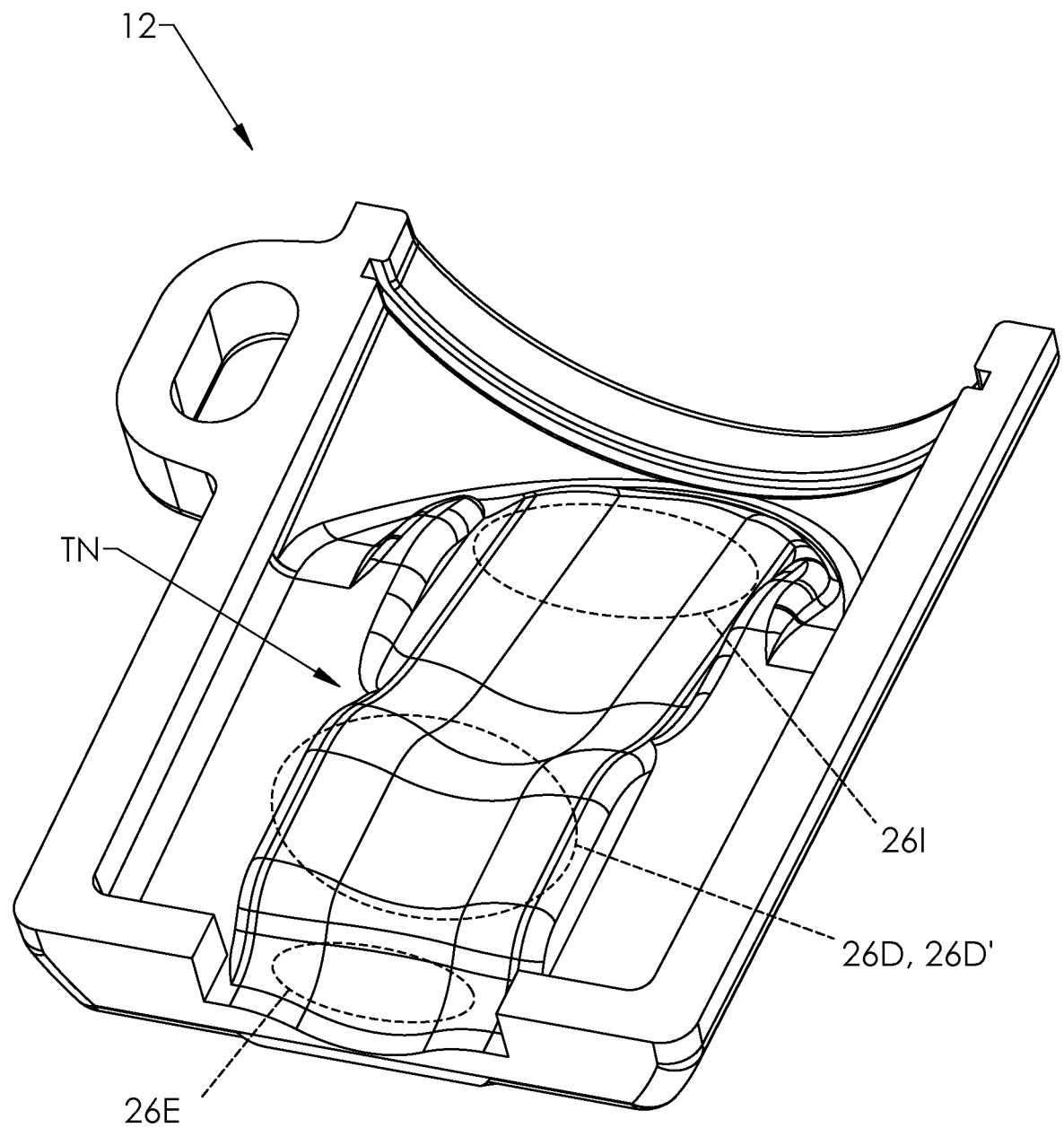
FIG. 18B is the view of FIG. 18A except with dashed-line ovals indicating three areas of the tongue surface's transversely extending curvature.
Figure 18C:
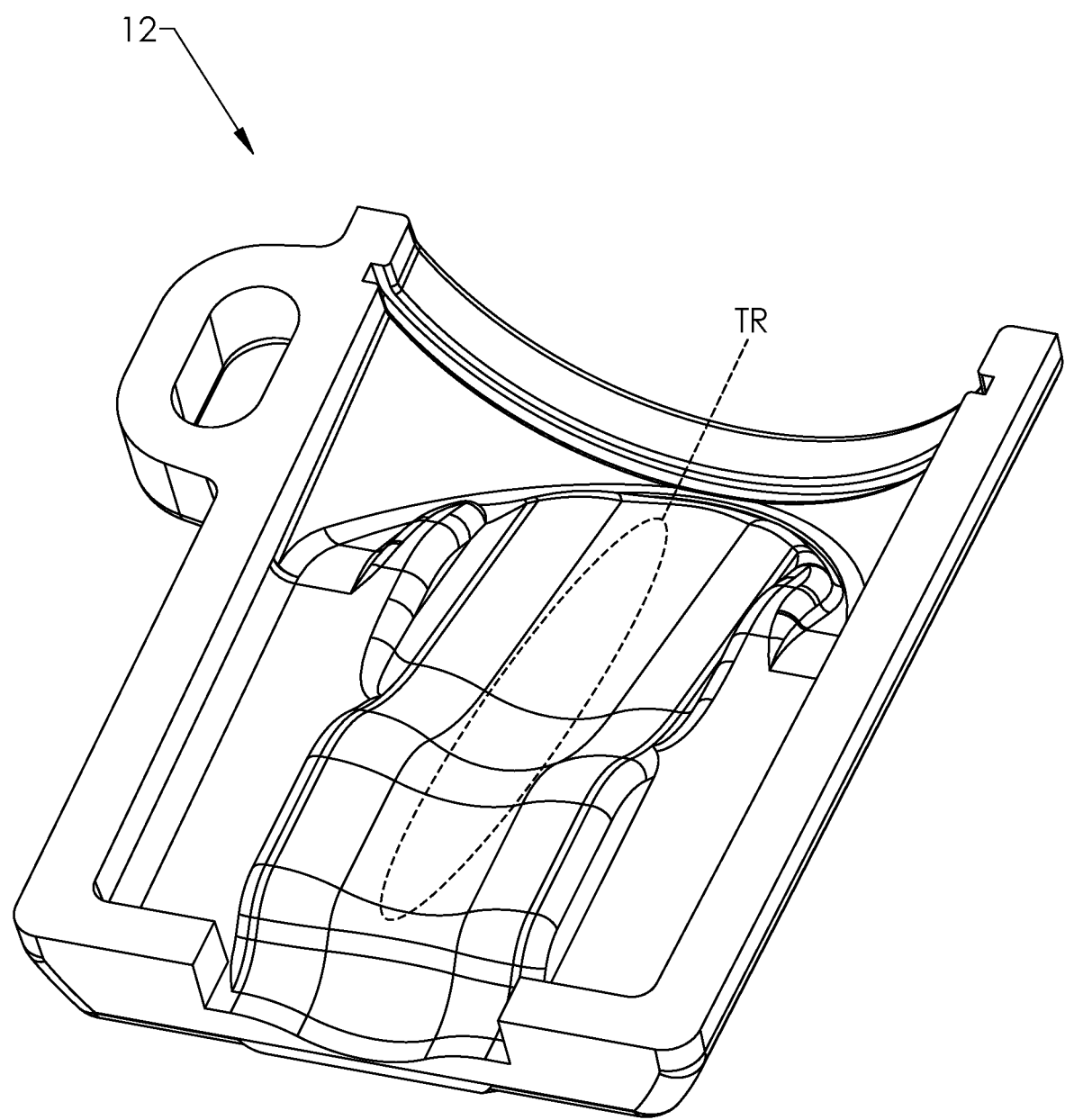
FIG. 18C is the view of FIG. 18A except with one dashed-line oval indicating the longitudinal trough extending along the tongue surface's longitudinally extending curvature.
Figure 19:
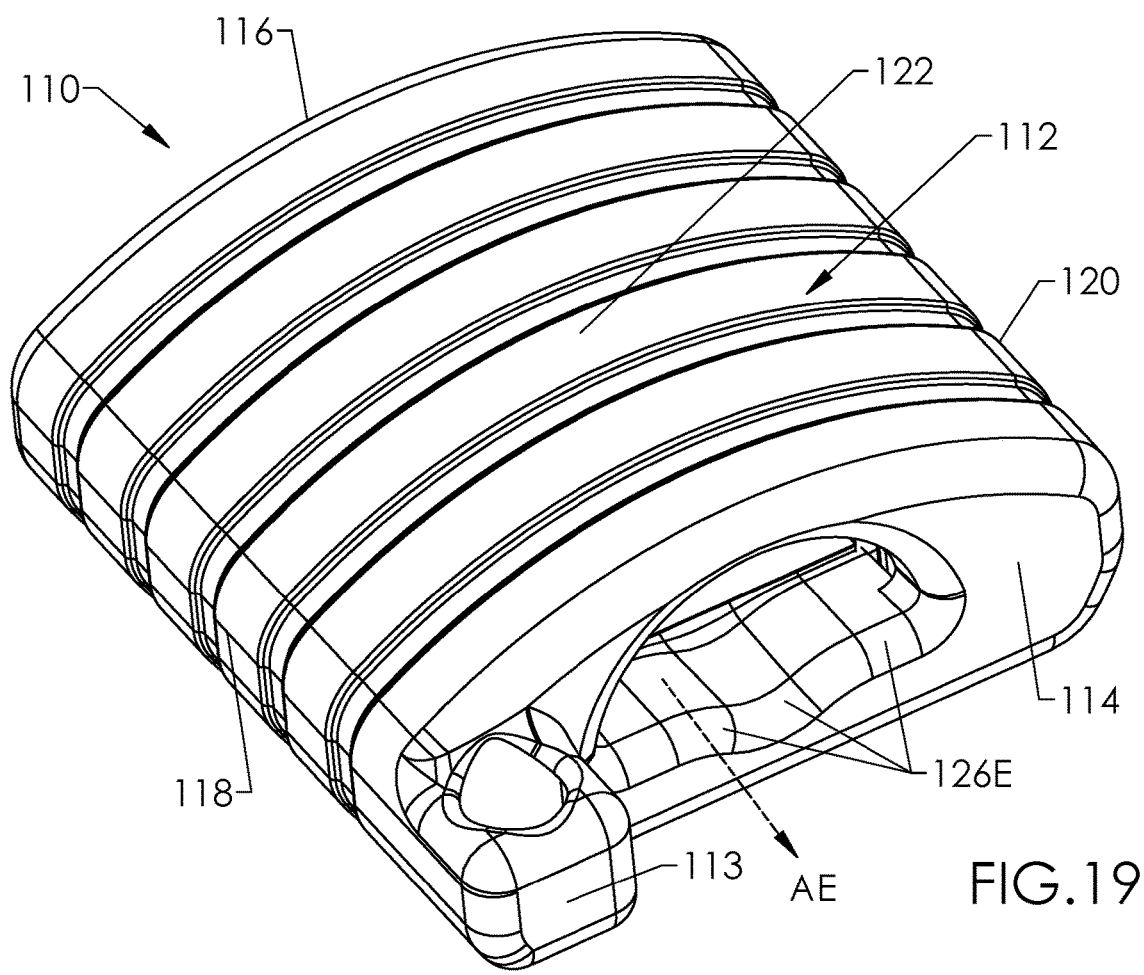
FIG. 19 is a top perspective view of an alternative embodiment of the invented game call.
Figure 20:
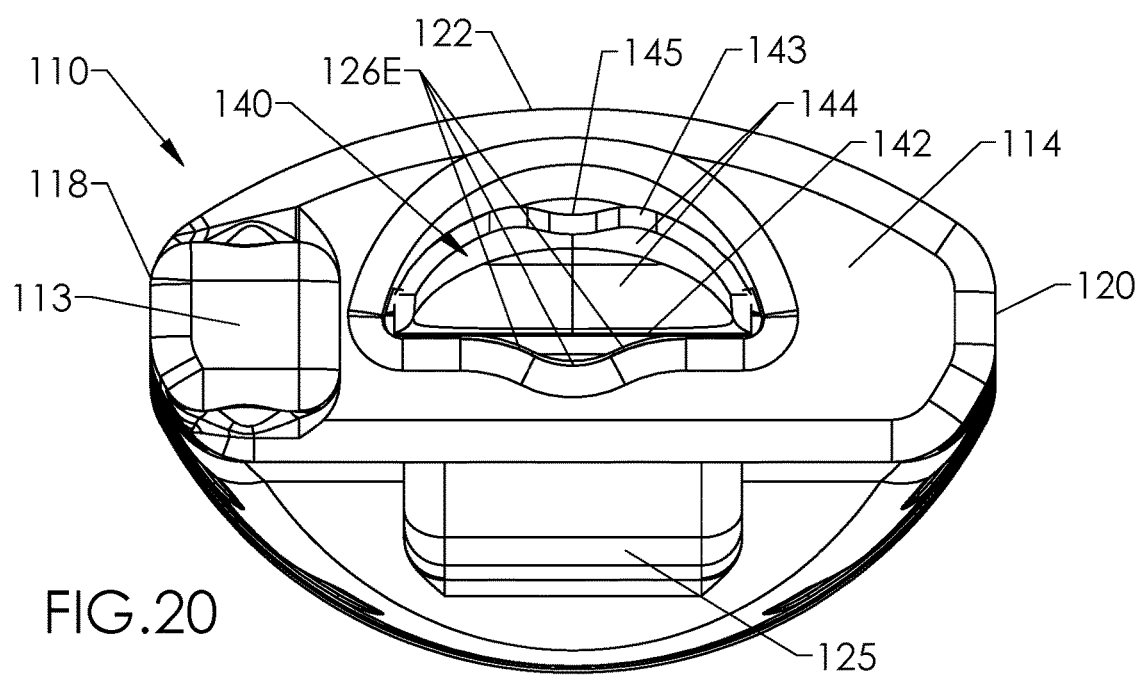
FIG. 20 is a proximal end view of the game call of FIG. 19.
Figure 21:
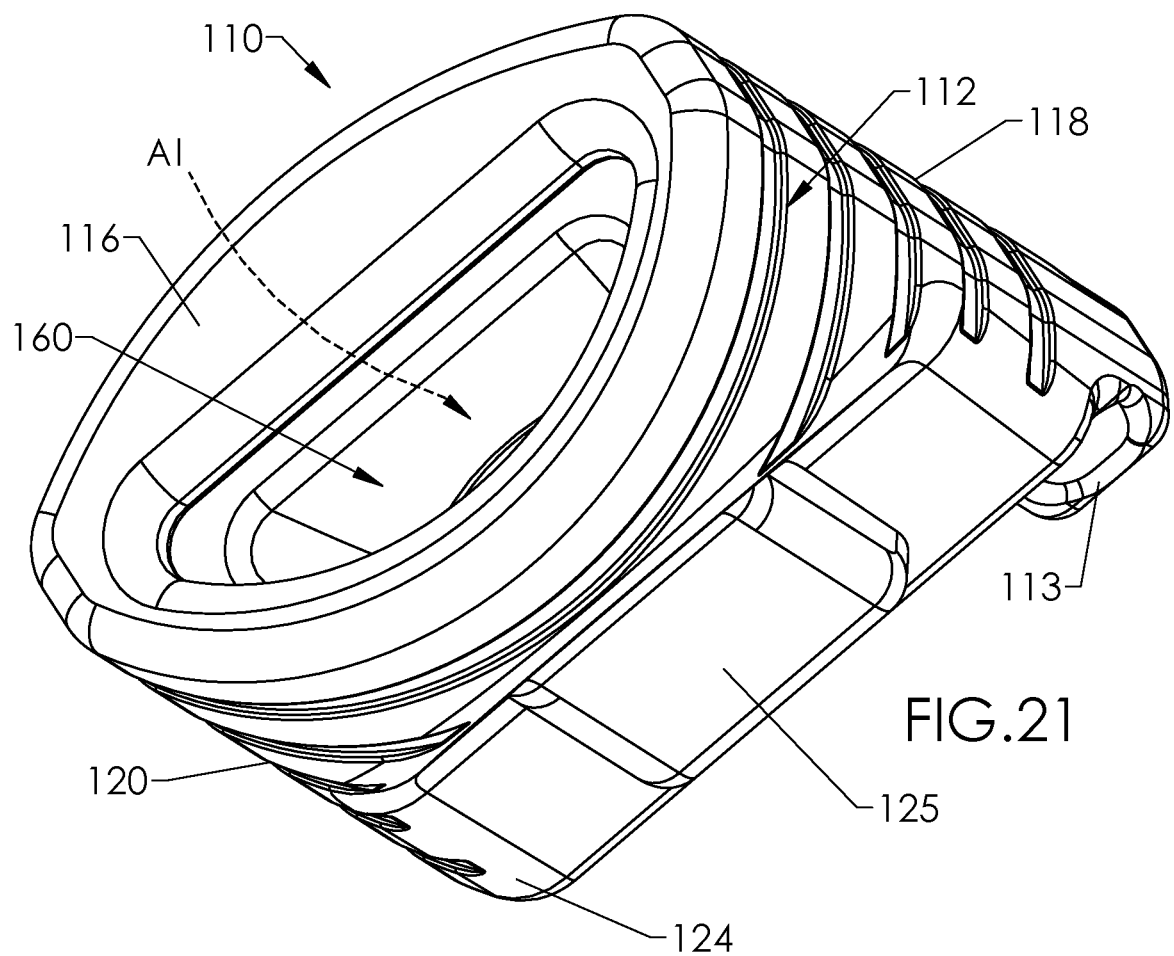
FIG. 21 is a bottom-distal perspective view of the game call of FIG. 19.
Figure 22:
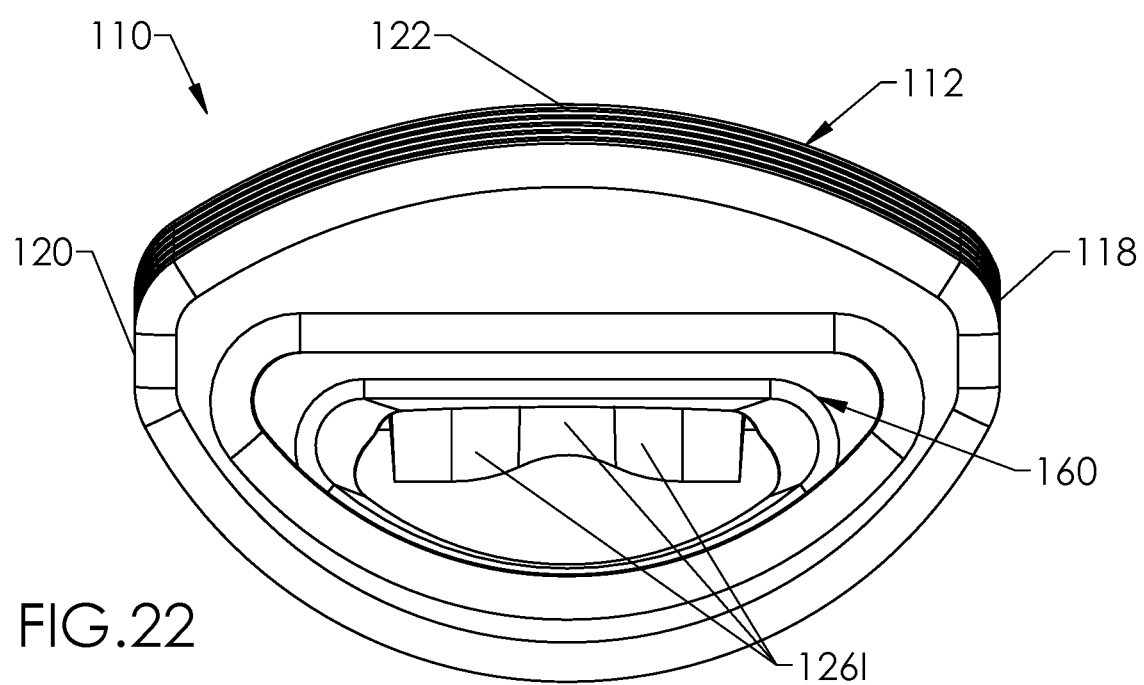
FIG. 22 is a distal end perspective view of the game call of FIG. 19.
Figure 23:
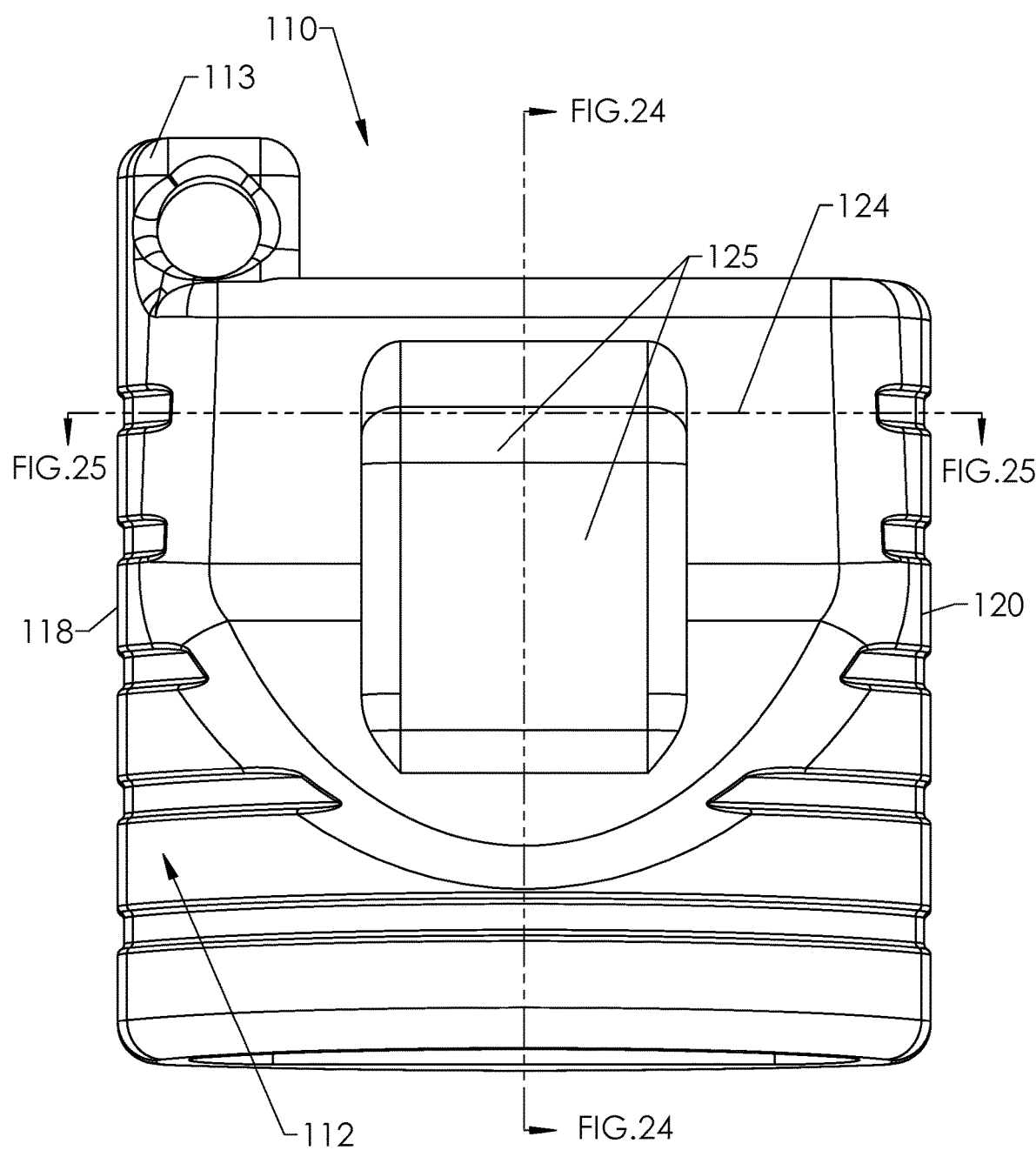
FIG. 23 is a bottom view of the game call of FIG. 19.
Figure 24:
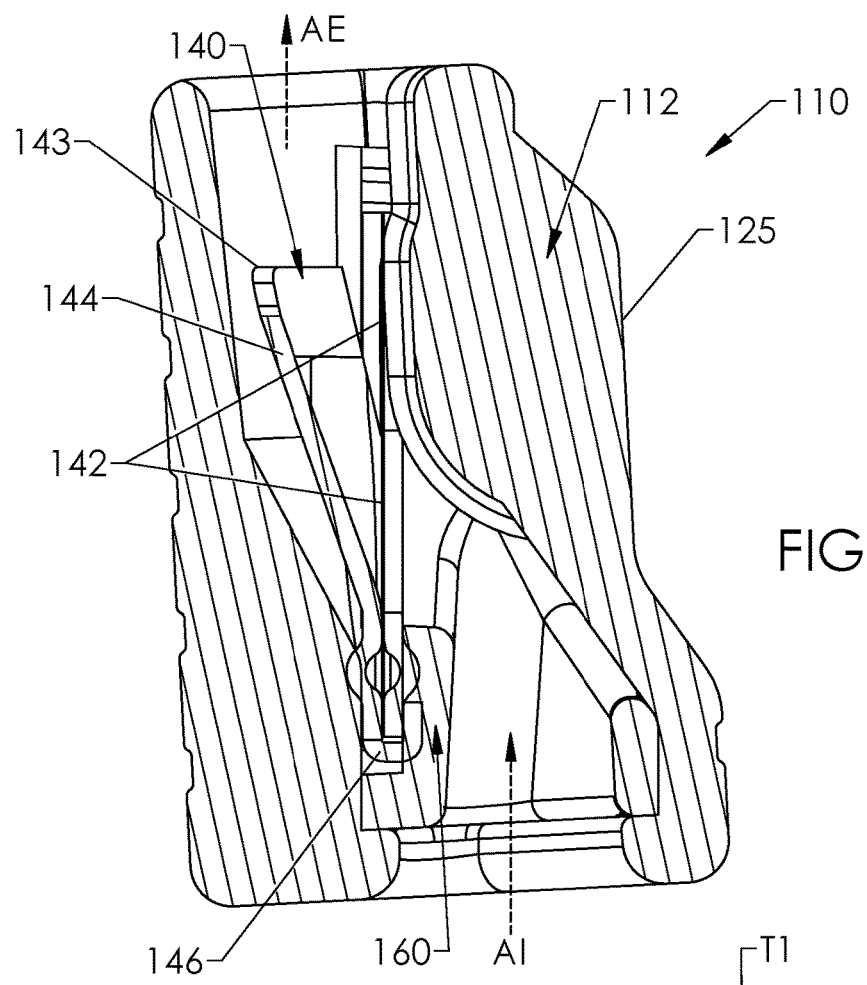
FIG. 24 is a cross-sectional view of the game call of FIG. 19, viewed along the line 24-24 in FIG. 23.
Figure 25:
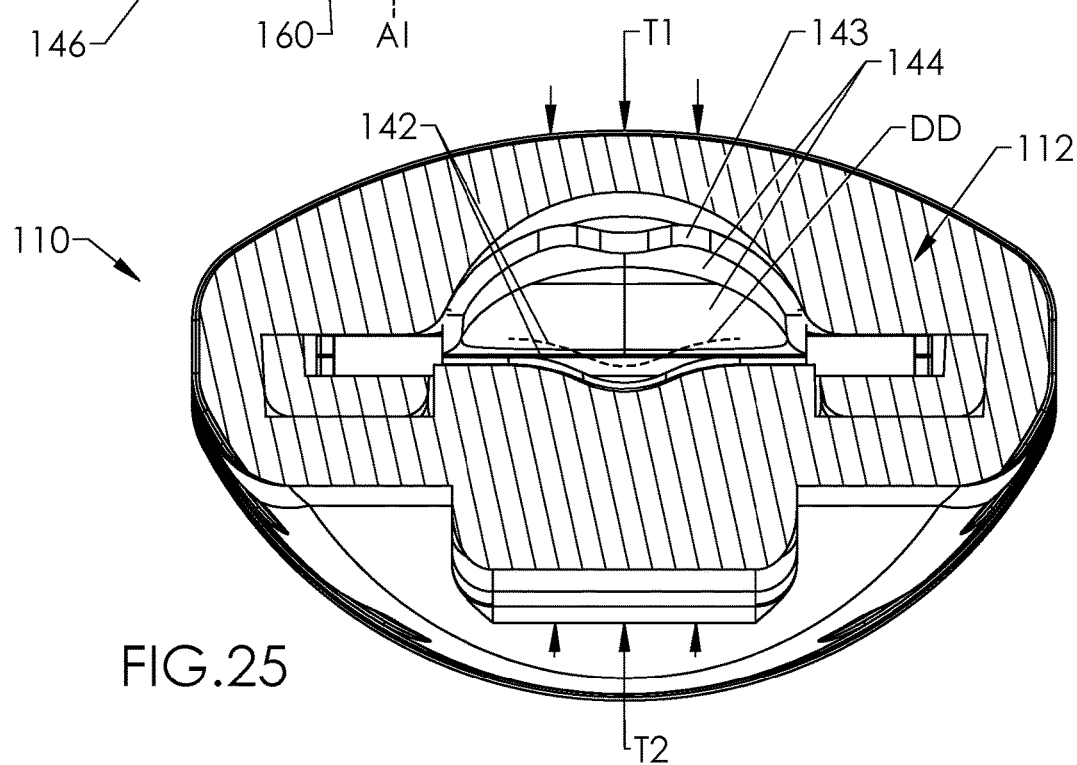
FIG. 25 is a cross-sectional view of the game call of FIG. 19, viewed along the line 25-25 in FIG. 23.
Figure 24A:
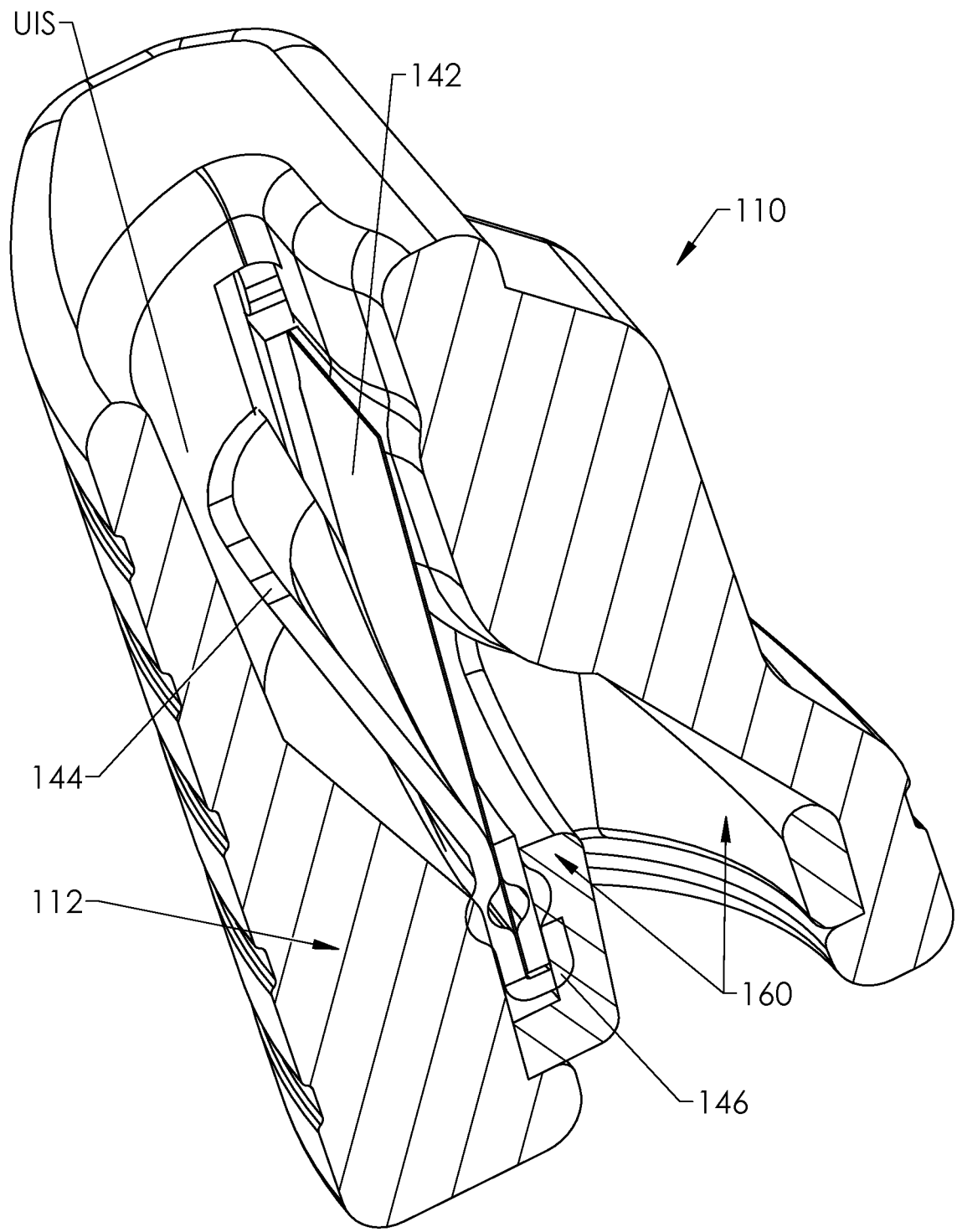
FIG. 24A is a cross-sectional perspective view of the game call similar to that in FIG. 24, except rotated to be in perspective.
Figure 25A:
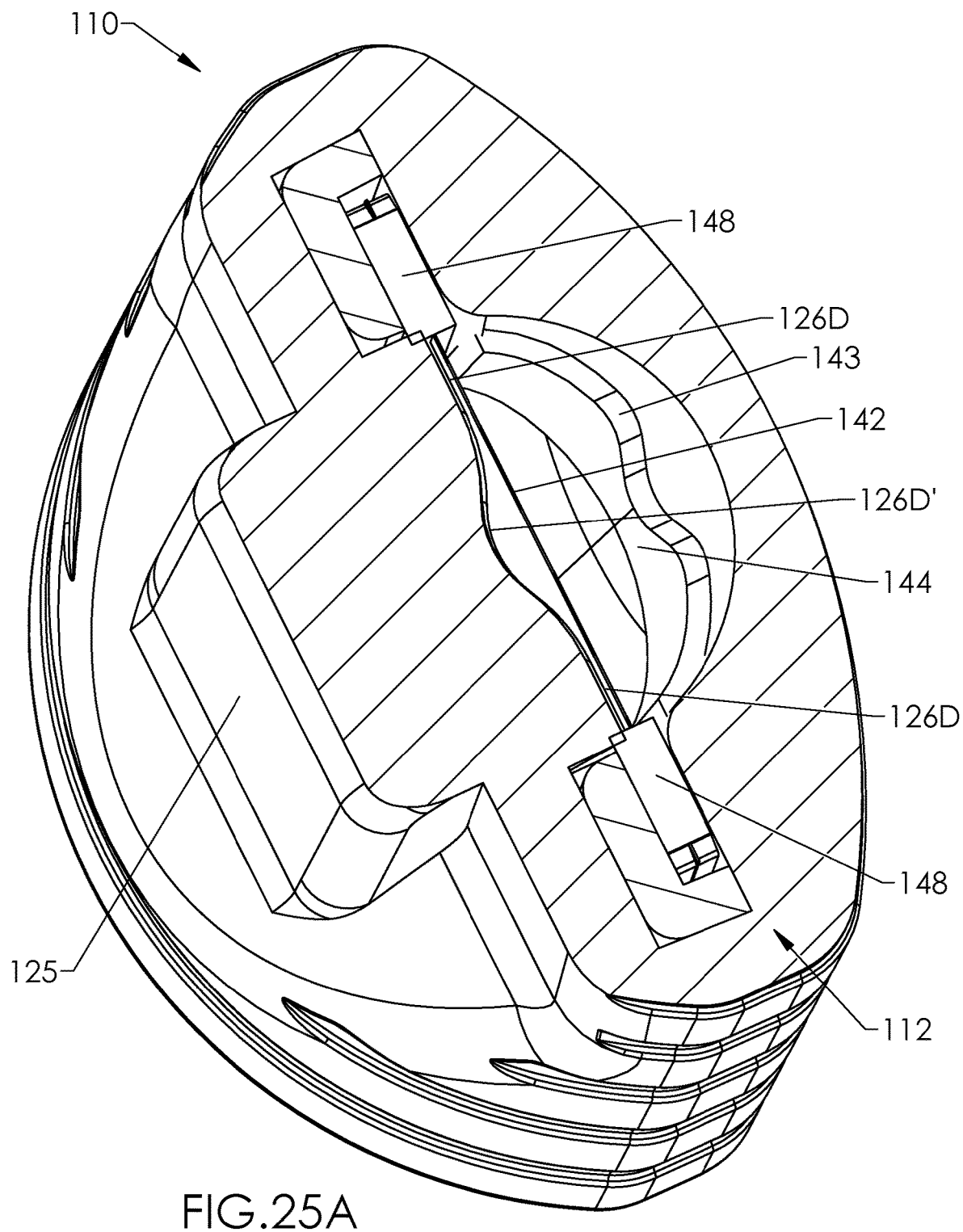
FIG. 25A is a cross-sectional perspective view similar to that in FIG. 25, except rotated to be in perspective.
Figure 26:
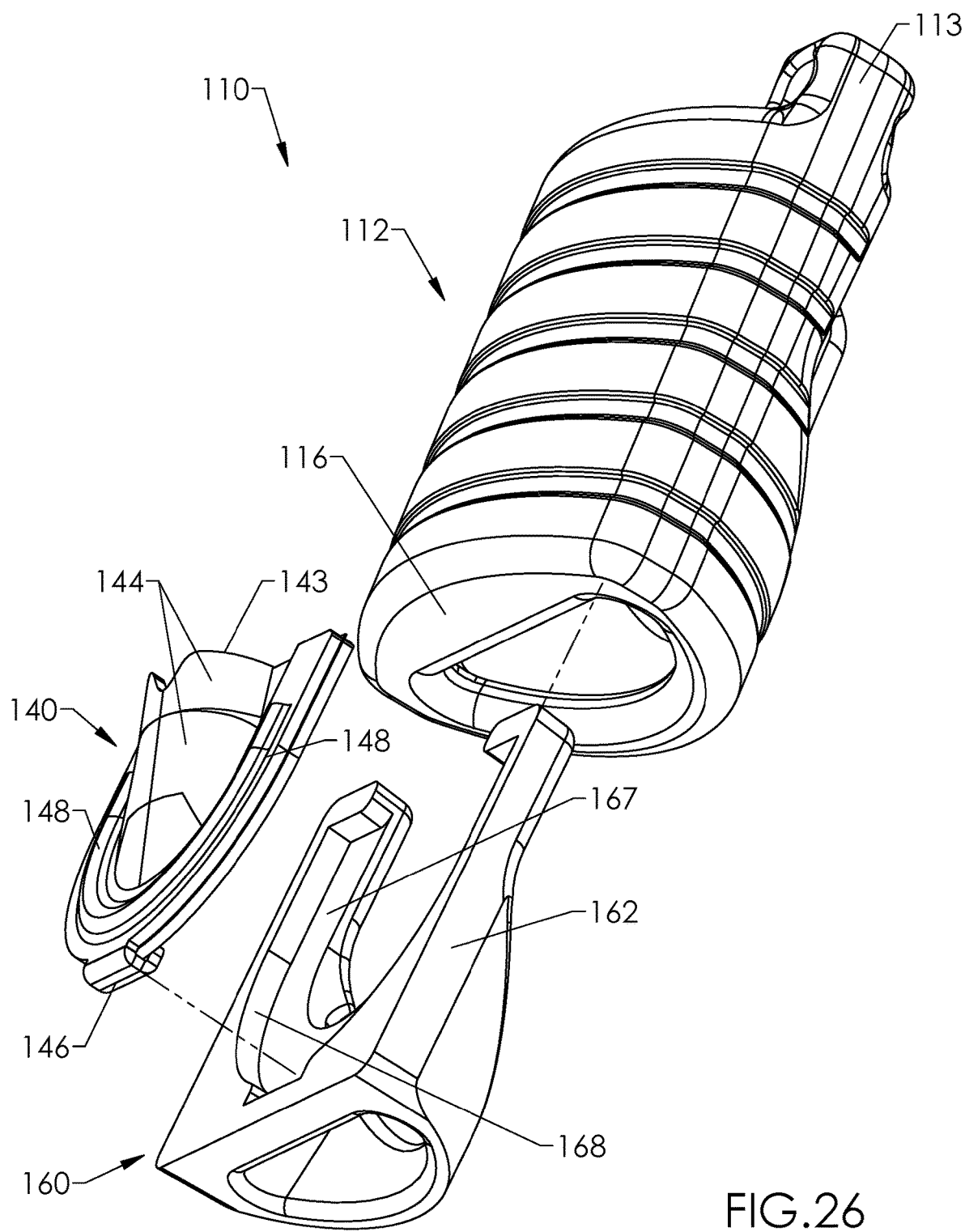
FIG. 26 is an exploded view of the game call of FIG. 19, showing the diaphragm unit that, during assembly of the call, is inserted into the cassette that is then inserted into the call body.
Figure 27:
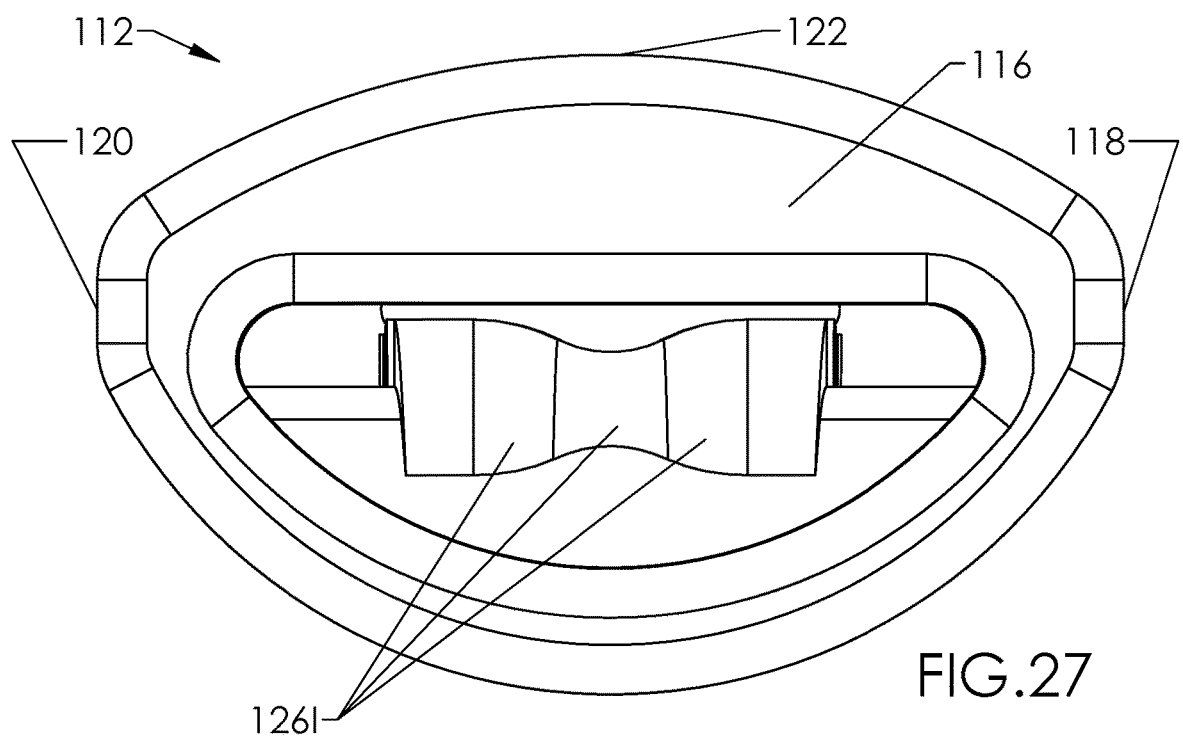
FIG. 27 is a distal end view of the body of the game call of FIG. 26.
Figure 28:
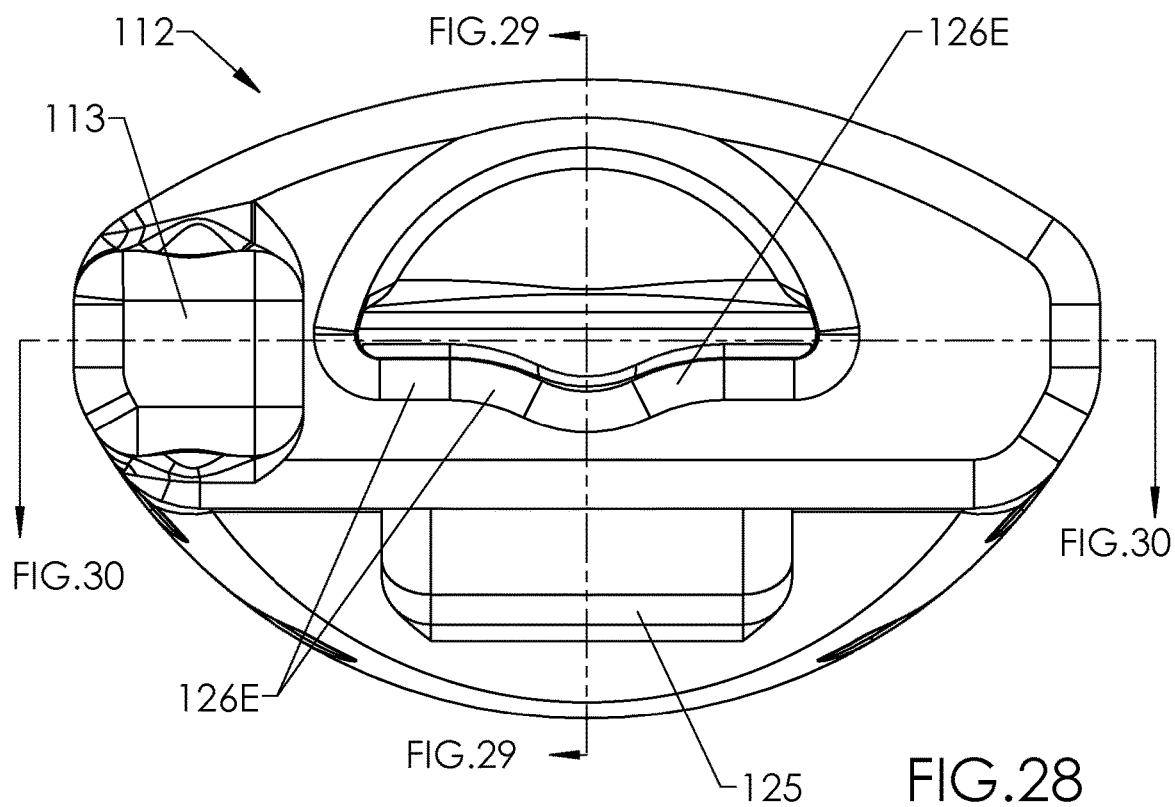
FIG. 28 is a proximal end view of the body of the game call of FIG. 26.
Figure 29:
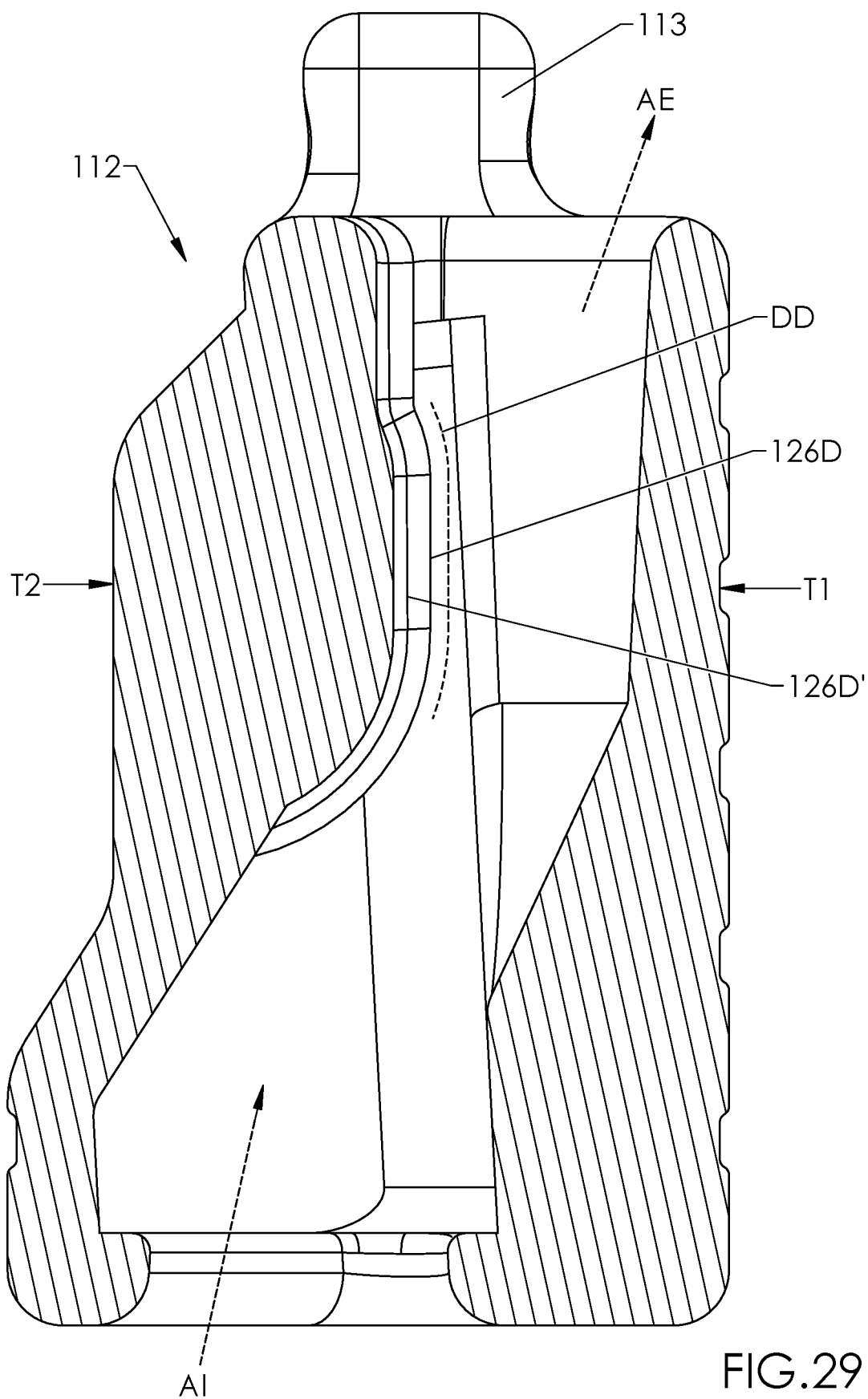
FIG. 29 is a cross-sectional view of the body of the game call of FIG. 26, viewed along the line 29-29 in FIG. 28.
Figure 29A:
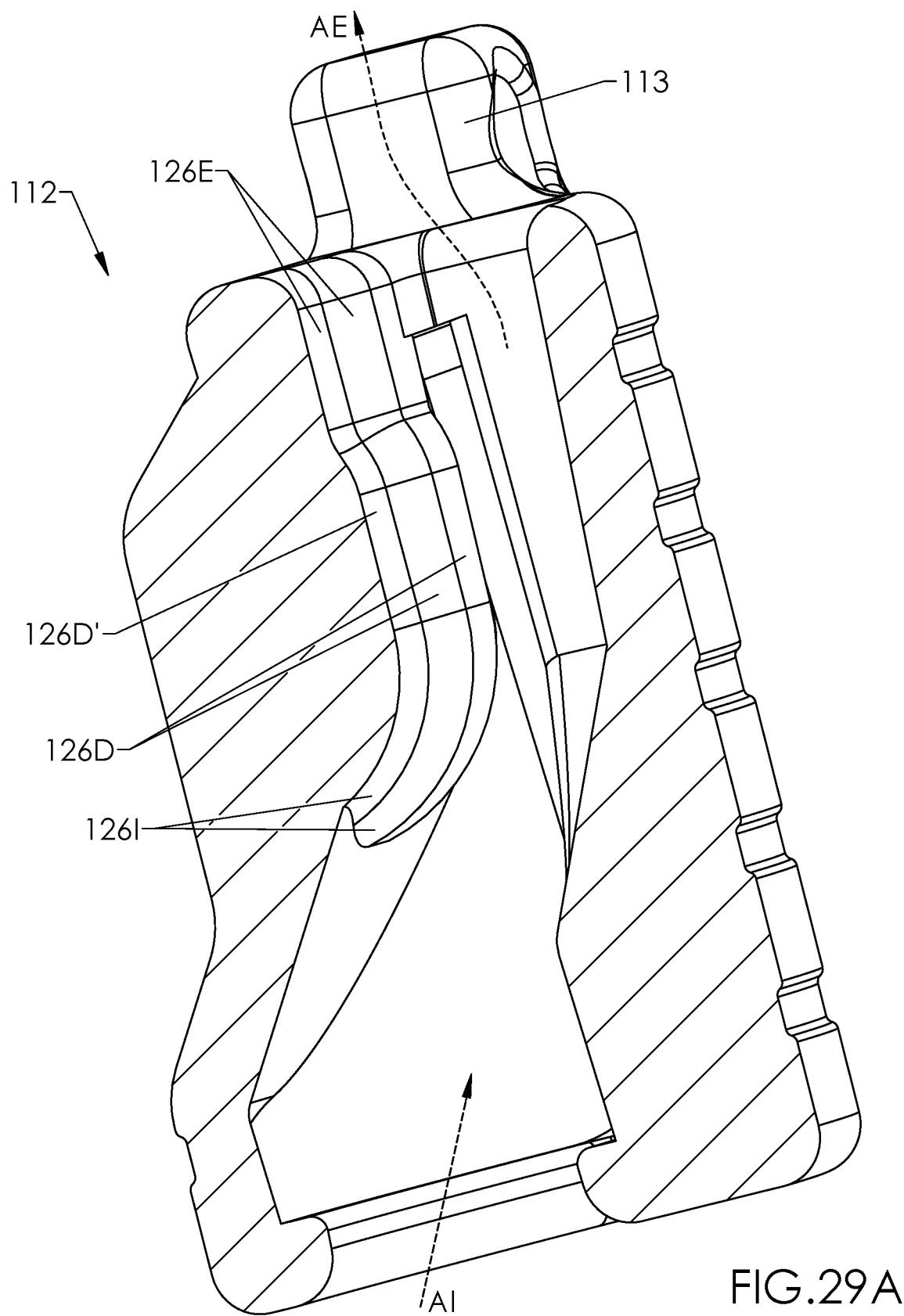
FIG. 29A is a cross-sectional view of the body of the game call similar to that in FIG. 29, except rotated to be in perspective.
Figure 30:
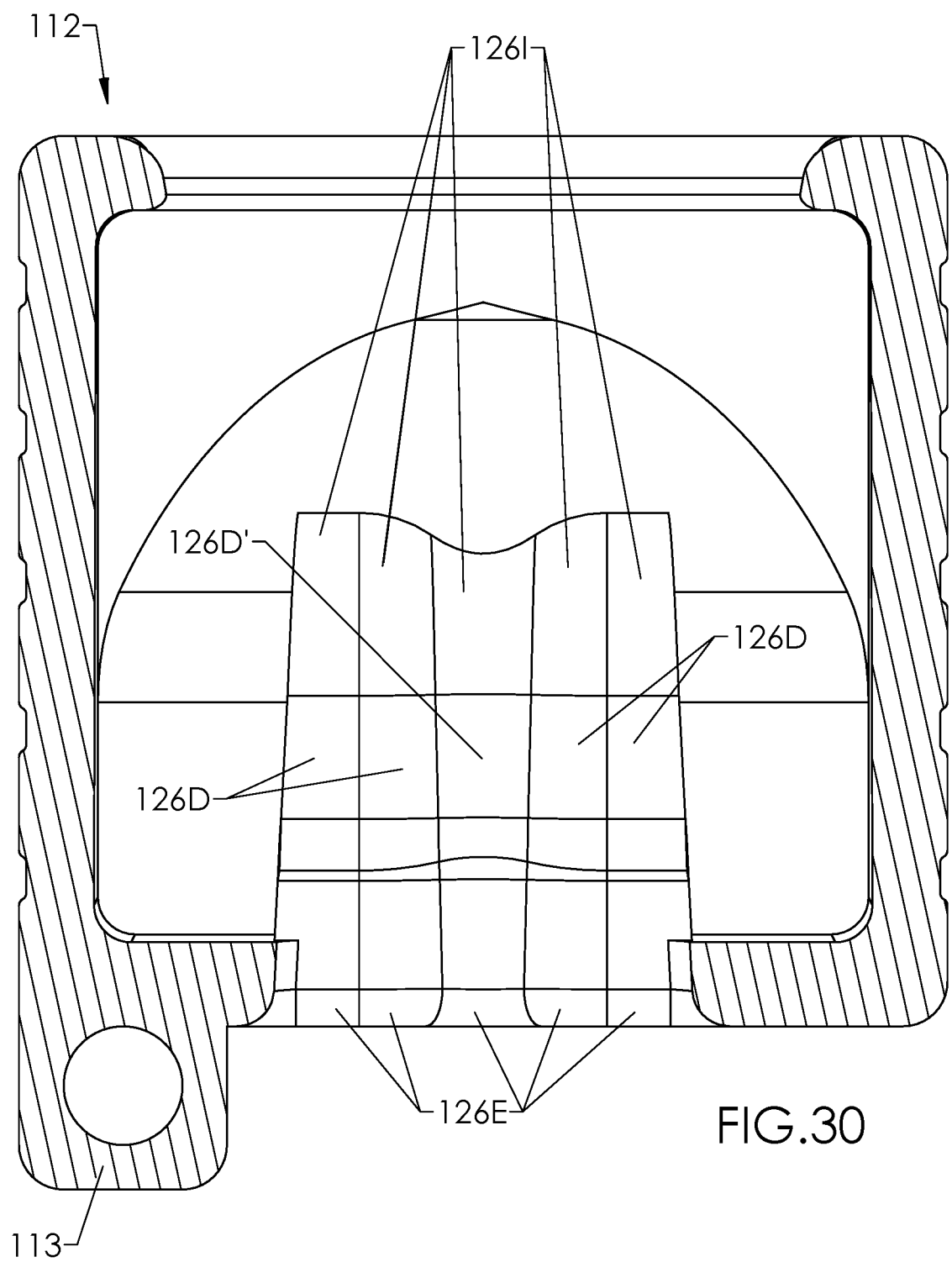
FIG. 30 is a cross-sectional view of the body of the game call of FIG. 19, viewed along the line 30-30 in FIG. 28.
Figure 30A:
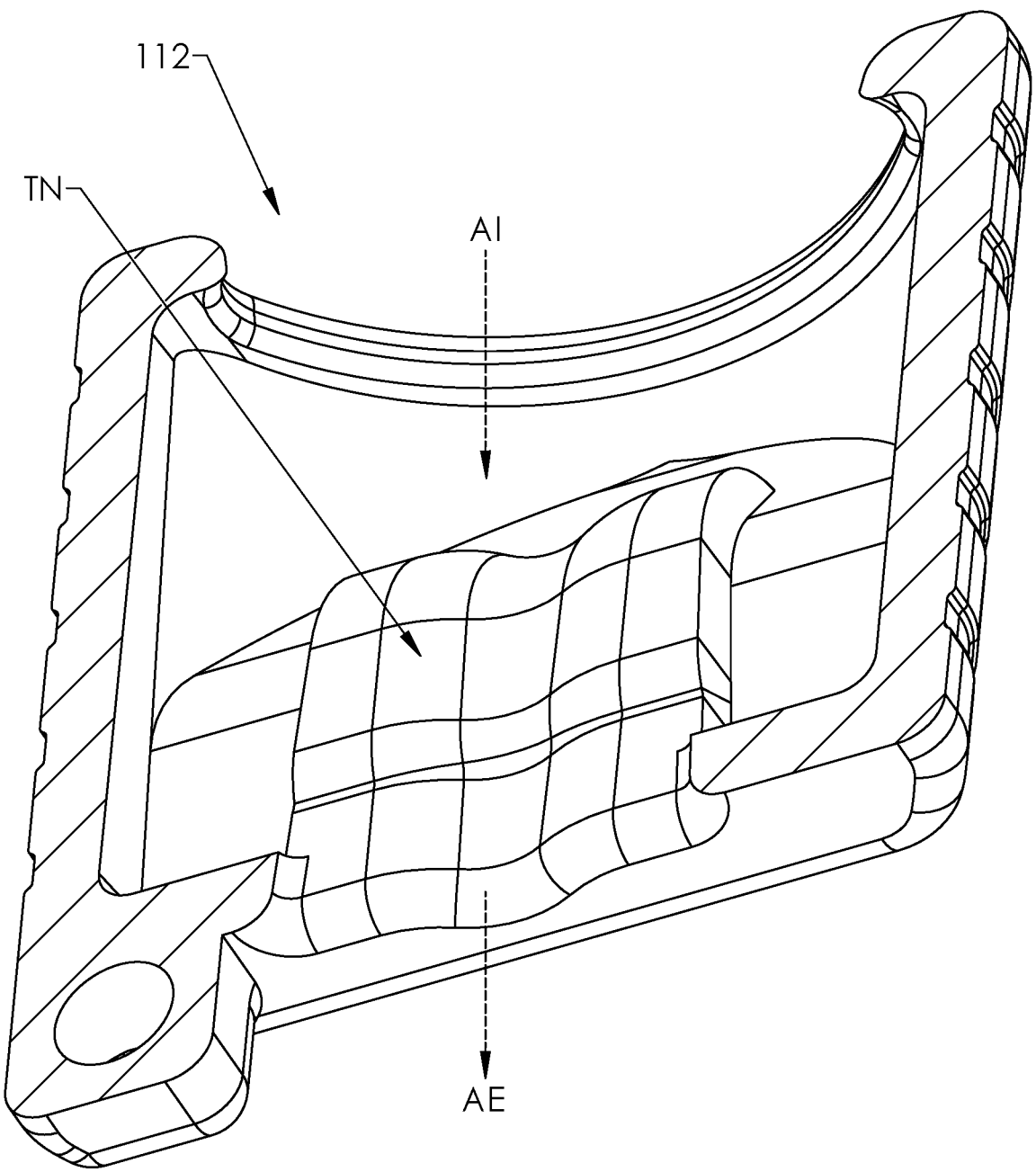
FIG. 30A is a perspective cross-sectional view of the body similar to that in FIG. 30, except rotated to be in perspective.
Figure 30B:
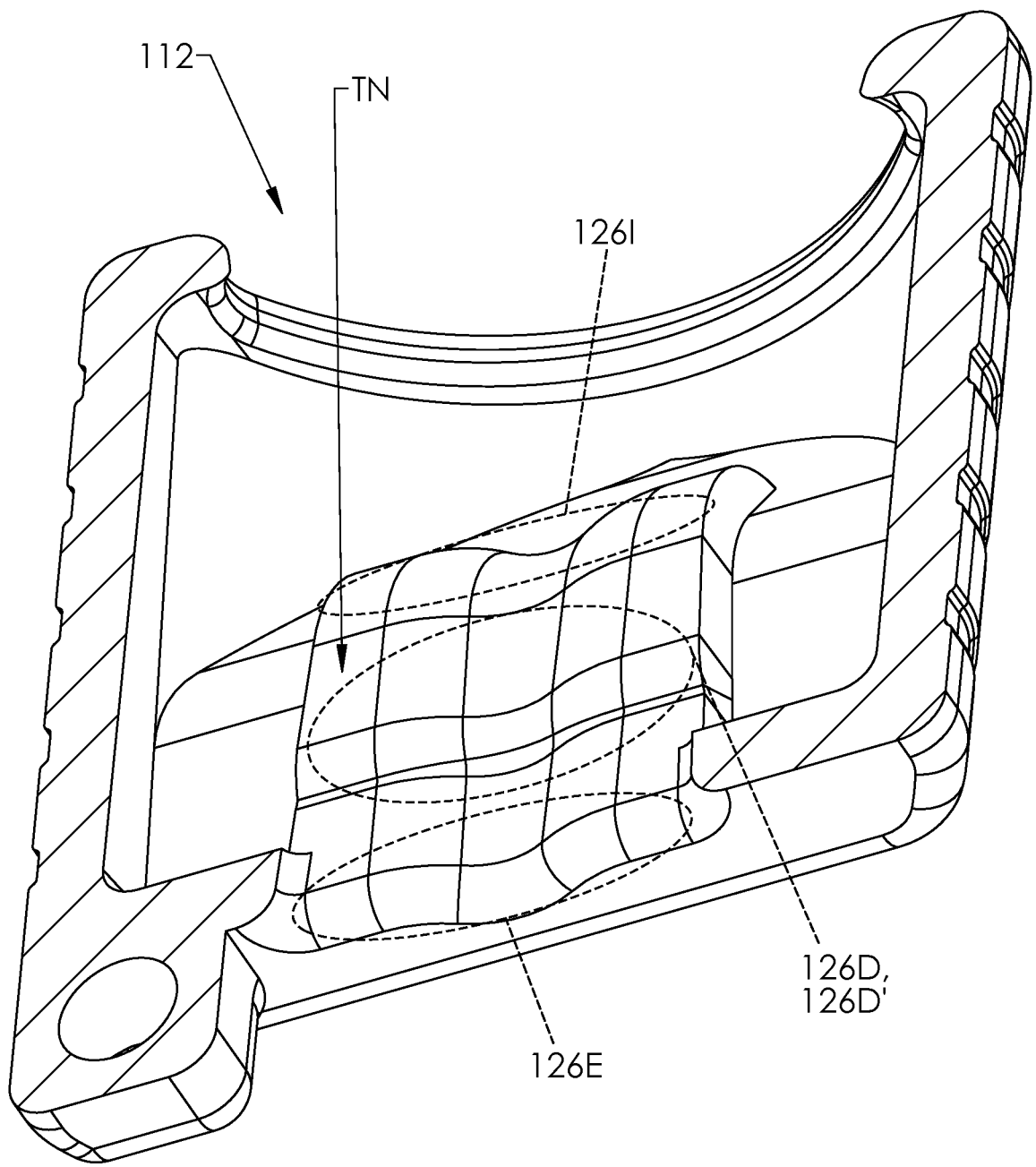
FIG. 30B is the view of FIG. 30A except with dashed-line ovals indicating three areas of the tongue surface's transversely extending curvature.
Figure 30C:
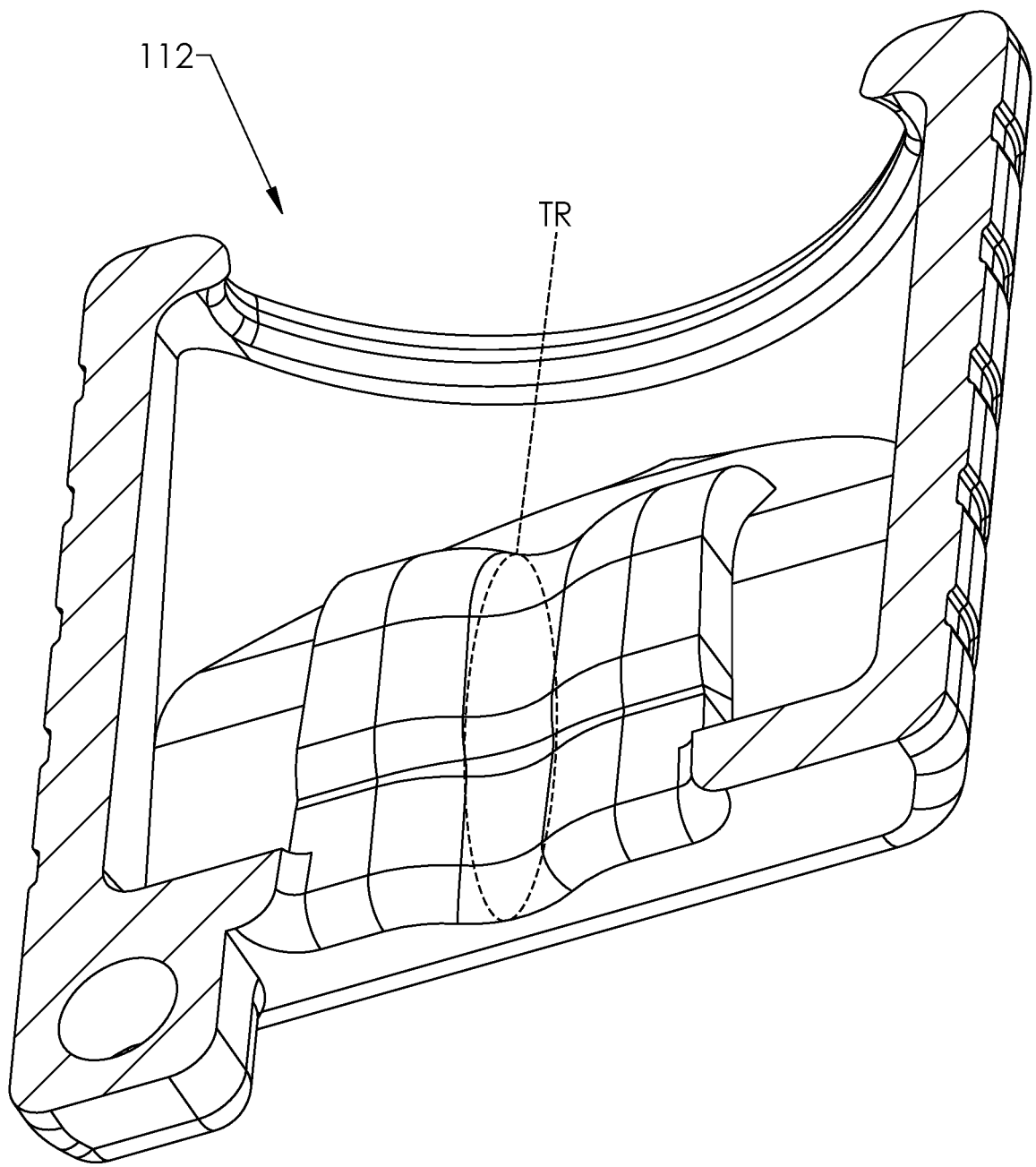
FIG. 30C is the view of FIG. 30A except with one dashed-line oval indicating the longitudinal trough extending along the tongue surface's longitudinally extending curvature.

In FIGS. 7 and 8:

A top view of the game call 10 is shown in FIG. 7, wherein the proximal end 14 is at the bottom of the drawing, and the distal end 16 is at the top of the drawing. FIG. 8 is a transverse cross-section of FIG. 7, showing more detail of the diaphragm unit 40, that is, right and left edges 42' of the diaphragm 42 captured/clamped between upper and lower plates of a diaphragm frame 48 that uses a hook latch 46 to close the plates of the frame 48 (see also FIGS. 12-14), and the notch 45 in the proximal edge 43 of the diaphragm arch 44. FIG. 8 also shows the transverse curvature of the tongue TN directly under the diaphragm 42, including the right and left curvature portions 26D and the central curvature portion 26D' (also "central recessed region") in between portions 26D. In this view, a dashed line DD of the same shape as the curved tongue TN surface 26D, 26D' is drawn. This dashed line DD schematically represents how the tongue TN surface 26D, 26D', upon said biting between the user's teeth to create compressive force/pressure on the top side 22 (T1) and the bottom side 24 (T2), will rise up relative to the diaphragm 42 This "vertical squeezing" of the call body creates a narrowing of the air passageway at the diaphragm 42 and contact and pushing up ("engagement") of the TN surfaces 26D on the diaphragm 42. In typical use, the right and left curvature portions 26 (also "right and left edges") contact and push up on the diaphragm, but the central recessed region 26' does not contact the diaphragm and instead remains a portion of the passageway AP for air flow created by trough TN. Therefore, adjusting the applied pressure T1, T2 will adjust the distance of the artificial tongue surface from the diaphragm, and, once the tongue engages the diaphragm, increased pressure will press the diaphragm further upward and create tension on the diaphragm to increase its tautness. The diaphragm 42 in FIG. 8 is not shown to have moved or deformed in response to the movement of the tongue TN, but it will be understood that, depending on the amount of upward force/pressure on the diaphragm 42 caused by the tongue TN, the diaphragm will move and deform various amounts relative to its normal shape and position, which modifies/modulates the sounds from the game call. See also dashed line DD in FIG. 17 showing the tongue's TN changed position in response to the compressive forces T1 on the top of the game call and T2 on the bottom of the game call, created by the user's upper and lower teeth "biting" the game call body with various amounts of force while inhaling.

From the drawings, one may see that engagement of the tongue with the diaphragm in certain embodiments will comprise or consist essentially of the outer left and right regions of the artificial tongue contacting and pushing up on the diaphragm, with the central recessed region that is under the diaphragm not touching the diaphragm. This center recess region (see 26D' in the drawings) is directly under the diaphragm and is a portion of the tongue longitudinal recess or "trough" TR labeled in FIGS. 15, 18C and 30C.

The diaphragm unit 40 is typically held in place relative to the upper inner surface UIS of the call body due to the typically rigid arch 44, which is preferably made of metal, being close to or in contact with said upper inner surface UIS. See FIGS. 8 and 9.

Figure 9:
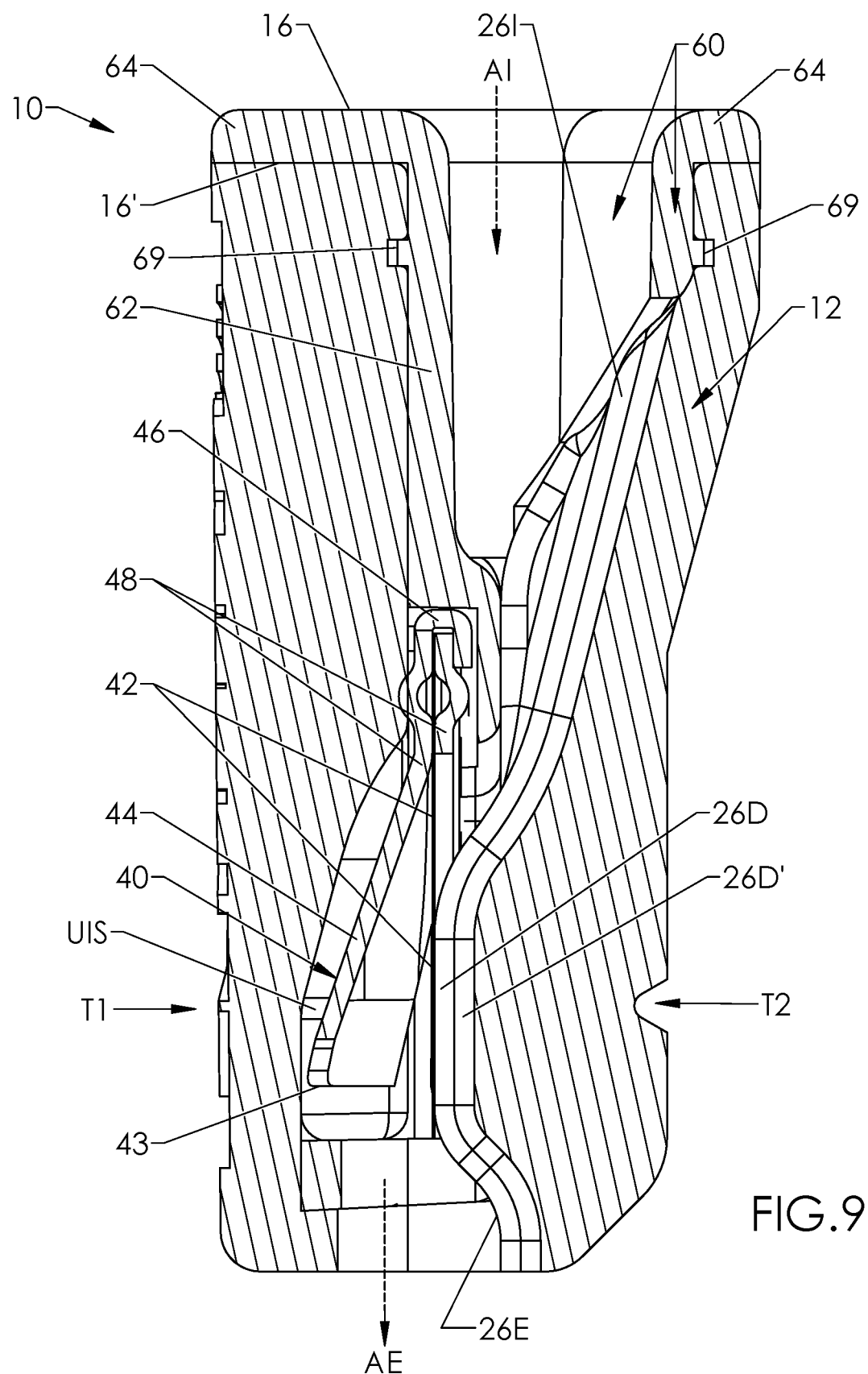
FIG. 9 is a cross-sectional view of the game call of FIG. 1 viewed along the line 9-9 in FIG. 7.
Figure 9A:
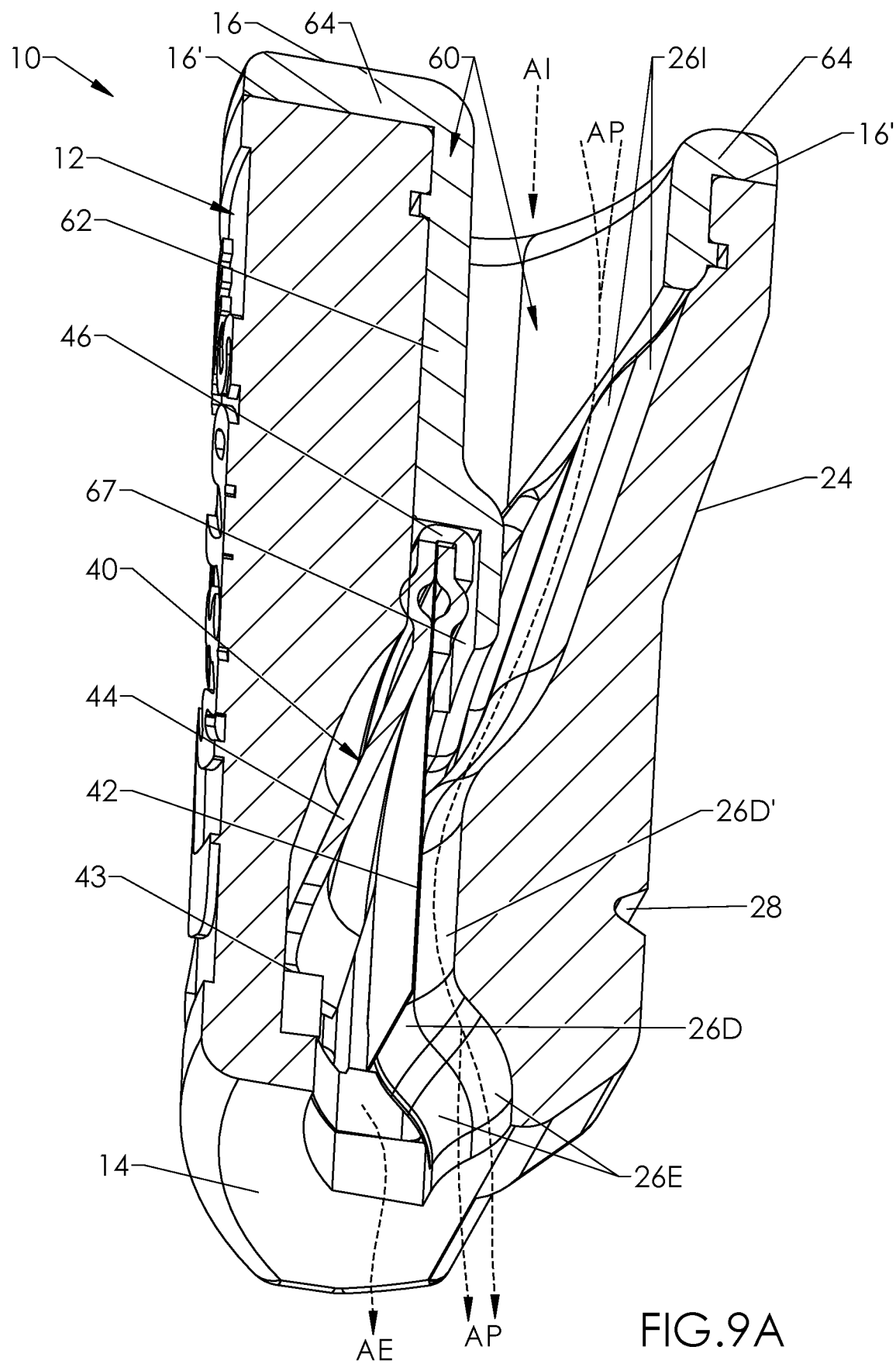
FIG. 9A is a cross-sectional view similar to that in FIG. 9 except rotated slightly to be in perspective.
Figure 10:
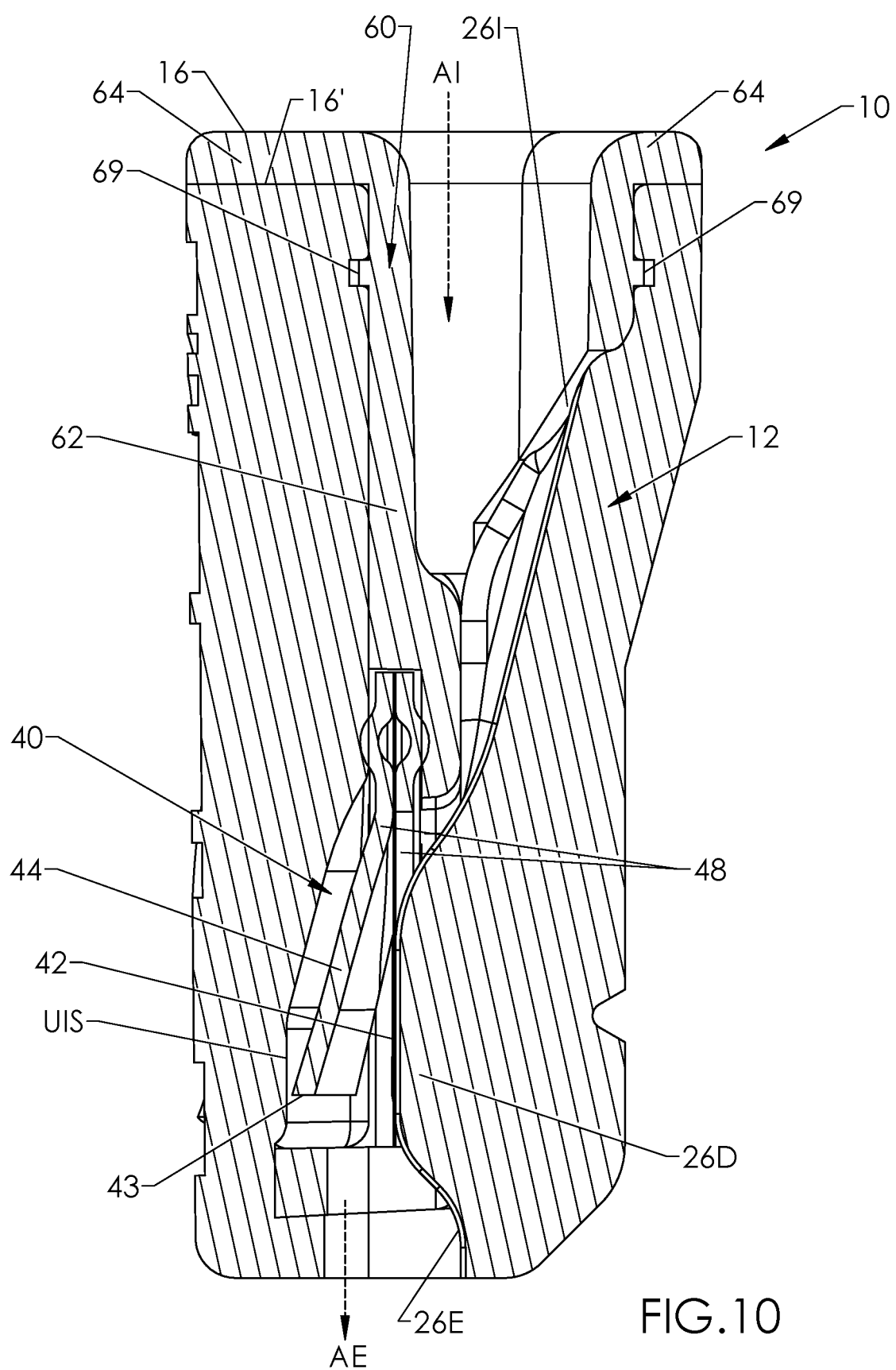
FIG. 10 is a cross-sectional view of the game call of FIG. 1 viewed along the line 10-10 in FIG. 7.
Figure 11:
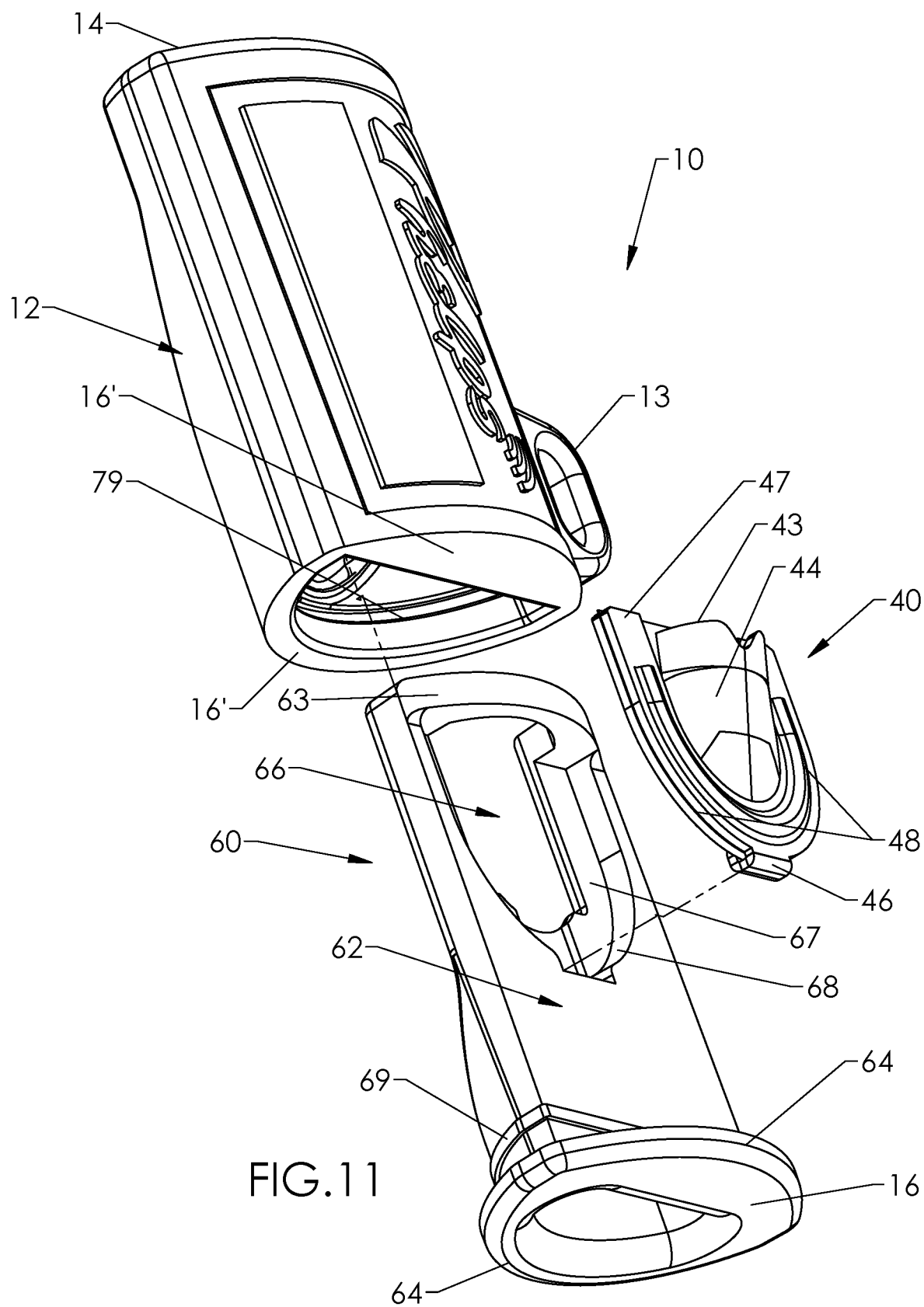
FIG. 11 is an exploded view of the game call of FIG. 1, showing the diaphragm unit that, during assembly of the call, is inserted into the cassette that is then inserted into the call body.

In FIGS. 9, 9A, and 10-13:

Longitudinal cross-sections of FIG. 7 are shown in FIGS. 9, 9A, and 10, to show the internal structure of the call and how the cassette 60, the diaphragm unit 40, and the body 12 cooperate. FIG. 11 shows the cassette 60 and diaphragm unit 40 exploded from the body. The cassette 60 comprises a main plate 62 having a cassette arch 63 at its proximal end and a flange 64 at its distal end. Reference number 64 indicates that the distal side 16 of the call is formed by the transverse flange 64 of the cassette 60 (see FIGS. 9, 9A, 10, and 11) when the cassette is installed into the body 12.

Figure 12:
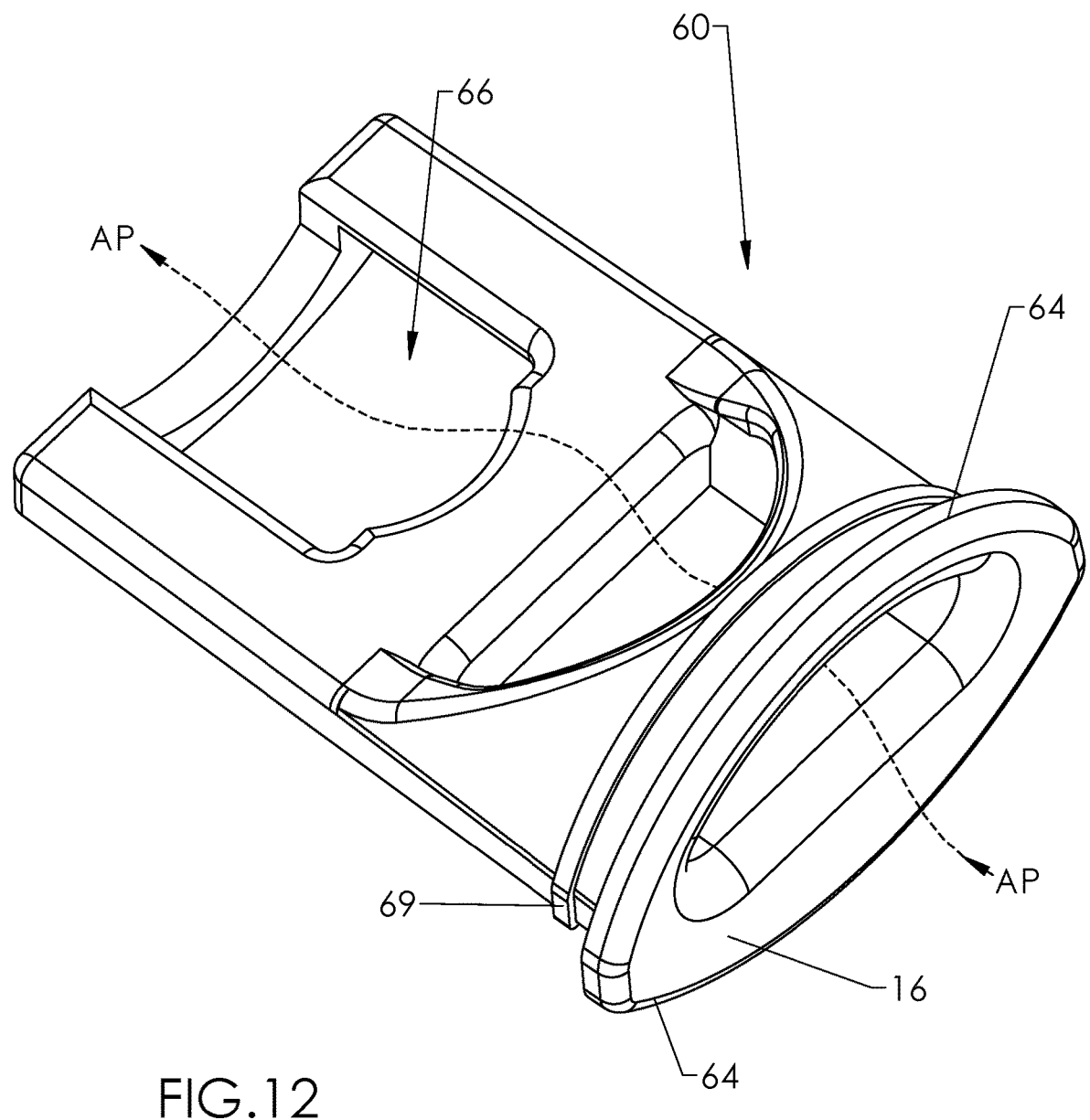
FIG. 12 is a bottom-distal perspective view of the cassette of FIG. 11. with a broken-line arrow schematically showing the air passageway extending through the cassette.
Figure 13:
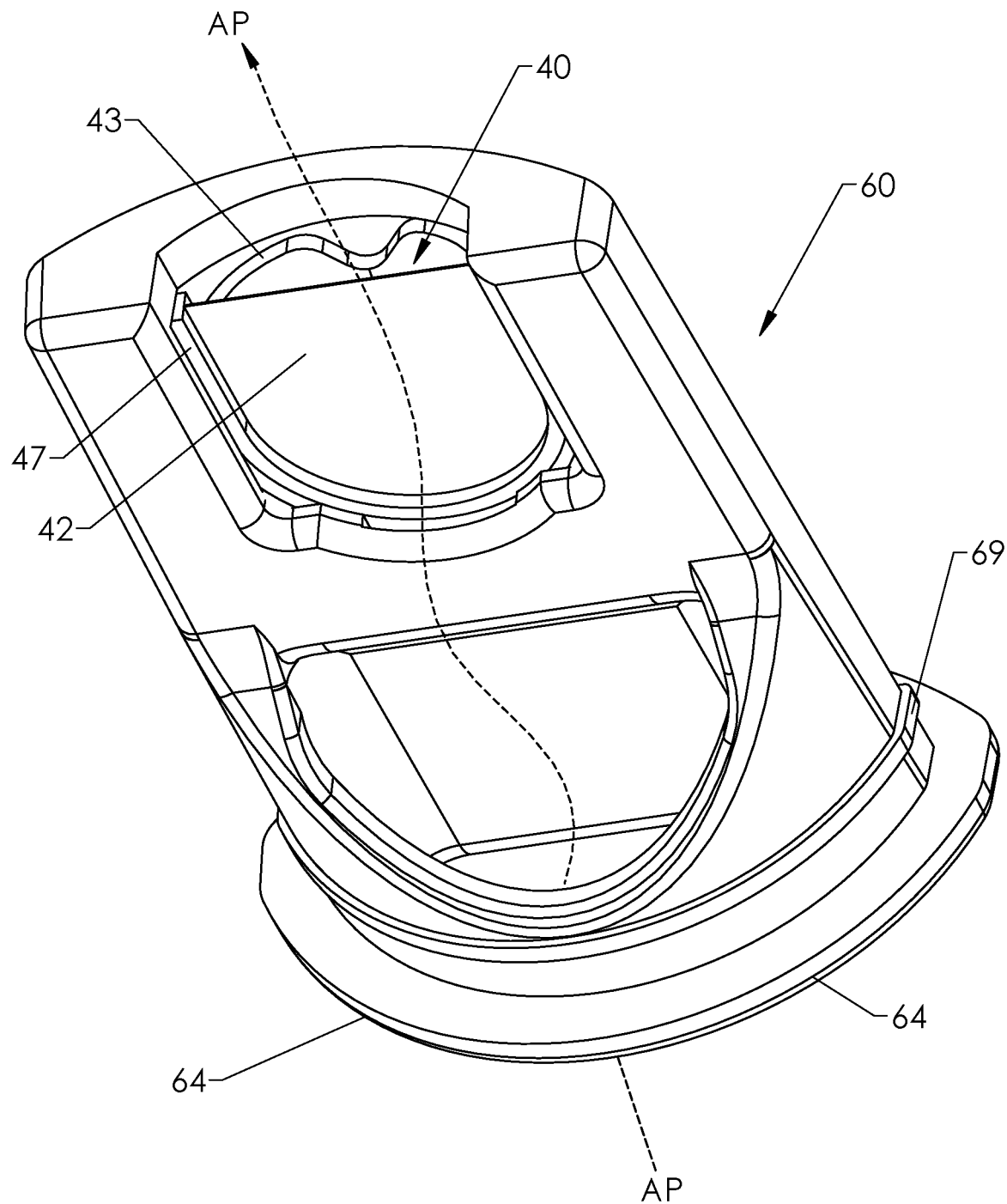
FIG. 13 is a bottom-proximal perspective view of the cassette of FIG. 11 with the diaphragm unit of FIG. 11 installed, with a broken-line arrow schematically showing the air passageway extending through the cassette including underneath the diaphragm.

Main plate 62 has an aperture 66 generally defined by the wall 68 and the ledge 67 that receives and support the diaphragm unit 40. The cassette 60 is configured so that air may pass from the distal end 16 through the body 12 to flow across the diaphragm, as discussed above, and out through the proximal end 14 to the user's mouth. It may be noted that cassette flange 64 distal surface is labeled 16 because it becomes, in this game call embodiment, the distal-most surface of the game call 10, whereas the distal-most surface of the body 12 (best seen in the exploded view in FIG. 11) is therefore labeled as 16' as it is typically covered by the flange 64 when the game call is fully assembled. An annular recess 79 around the inner surface of the distal end of the body receives a circular protrusion 69 provided on the cassette near the flange 64 to hold the cassette in proper location inside the body. The cassette is preferably hard, substantially or entirely inflexible, plastic. FIG. 12 illustrates air flow passageway AP through the cassette, without the diaphragm installed. FIG. 13 illustrates the air flow passageway AP through the cassette when the diaphragm is installed, wherein the air flows underneath and along the diaphragm, that is, along the diaphragm on the side of the diaphragm that is opposite of the diaphragm unit arch 44.

Figure 14:
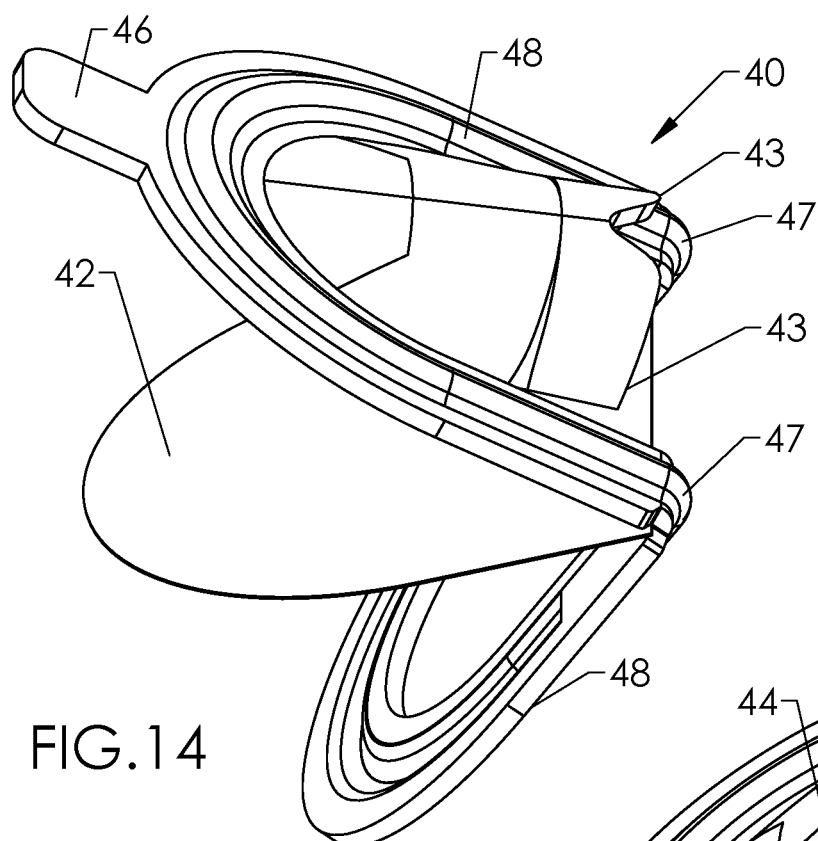
FIG. 14 is a side perspective view of a partially assembled diaphragm unit of FIG. 11, wherein the diaphragm is between the arms of an open frame.
Figure 14A:
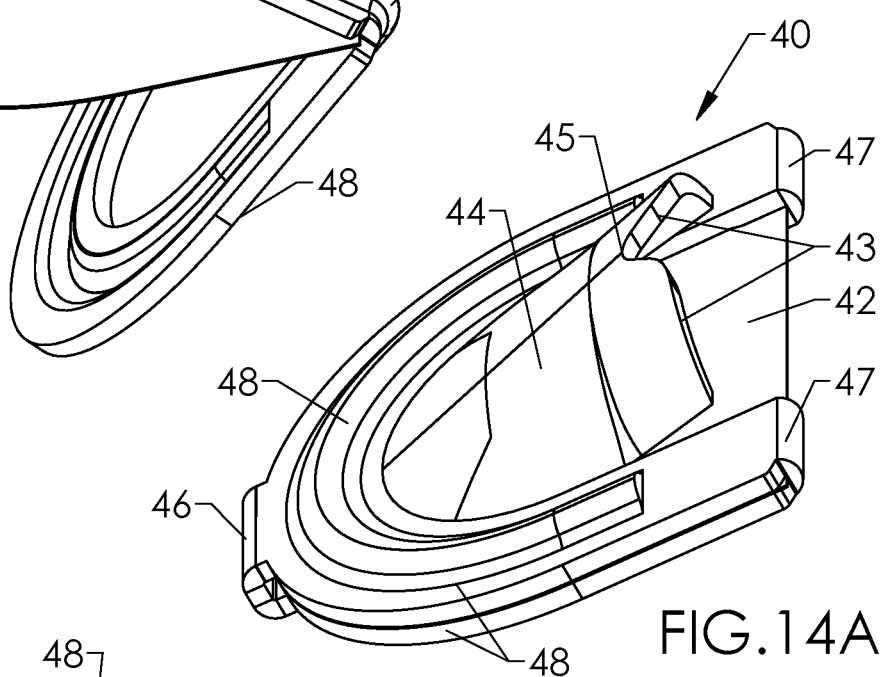
FIG. 14A is a top perspective view of the fully assembled diaphragm unit of FIG. 11, with the frame folded and latched to clamp the diaphragm around three sides, and the hinge of the frame being at the right and the hook latch being at the left.
Figure 14B:
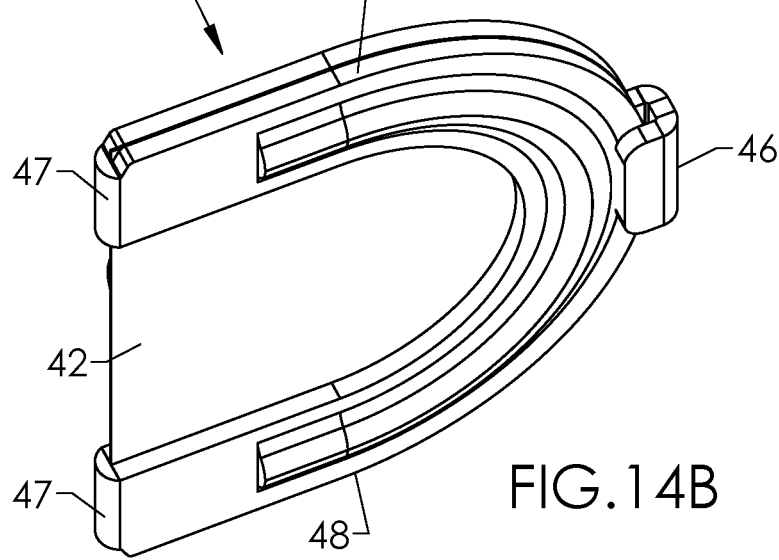
FIG. 14B is a bottom perspective view of the diaphragm unit of FIG. 14A, flipped to place the hinge at the left and the hook latch at the right.
Figure 15:
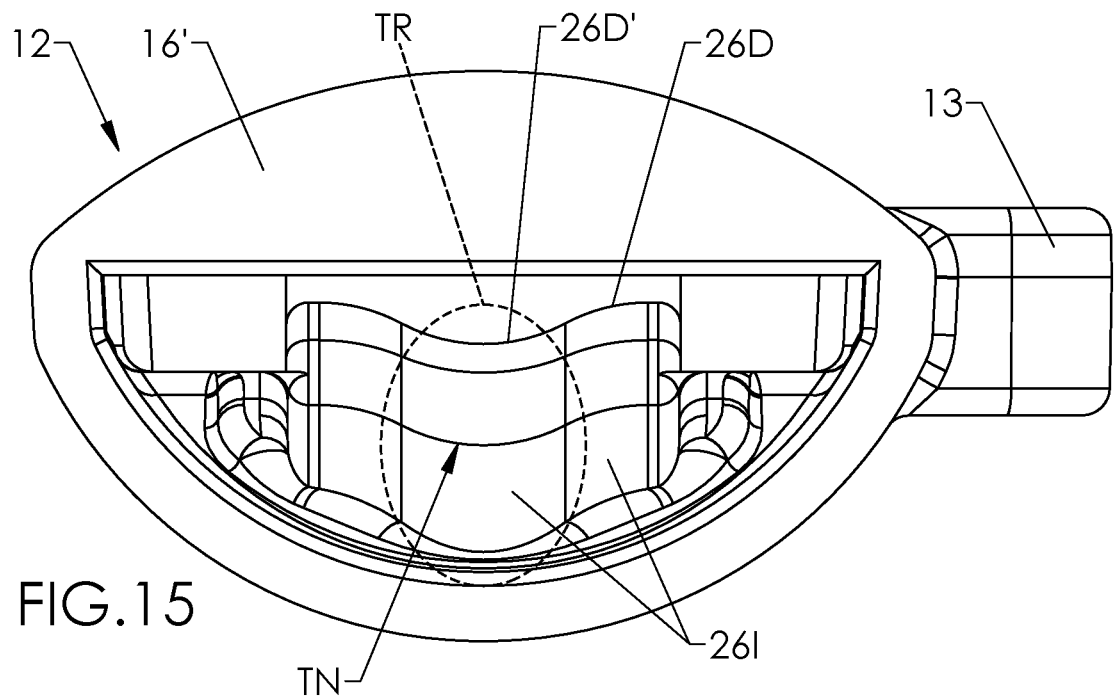
FIG. 15 is a distal end view of the body of the game call of FIG. 11.
Figure 16:
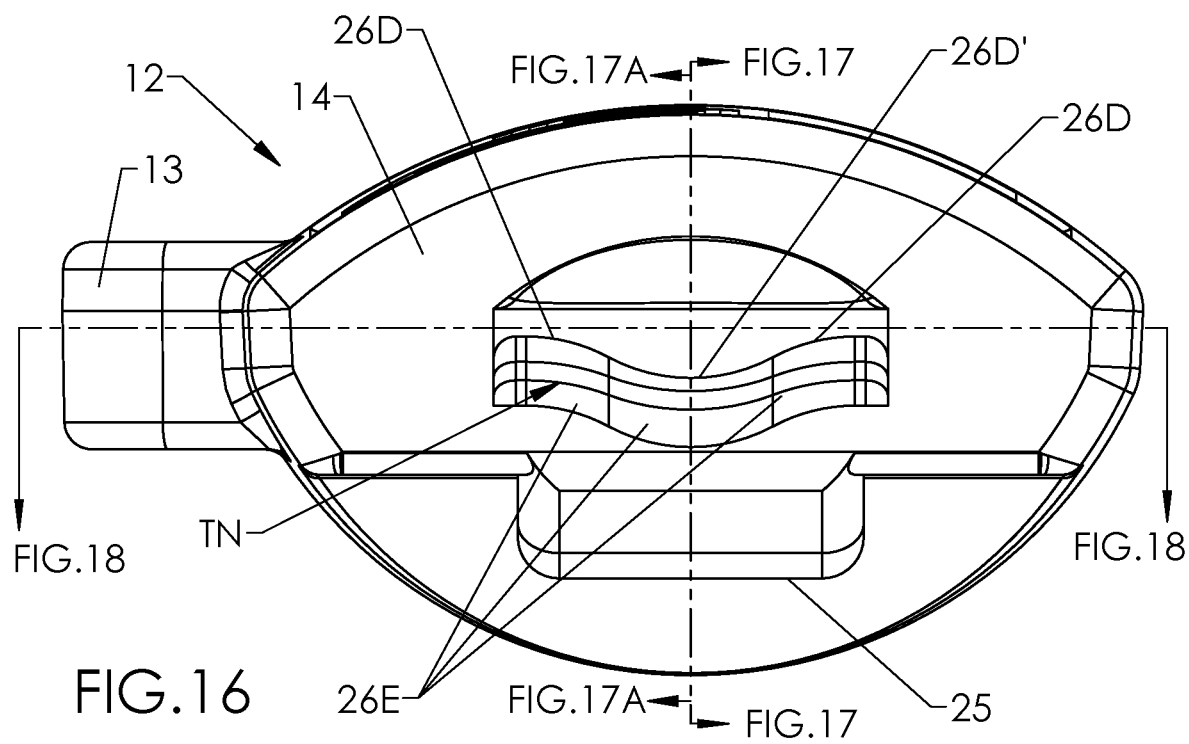
FIG. 16 is a proximal end view of the body of the game call of FIG. 11.

In FIGS. 14, 14A and 14B:

In FIGS. 14, 14A, and 14B show how the diaphragm unit may be formed in certain embodiments. The two halves of the frame 48 may be bent at hinge areas 47 to place plates of the frame 48 on top of and below the edges of three sides of the diaphragm 42. A fourth side of the diaphragm 42, at the left of the diaphragm unit in FIG. 14B, may be described as "free from" and/or "unattached to" the frame, as most of the fourth side extends between arms of the frame and is free to vibrate. A hook latch 46 is bent from one of the plates of the frame around the other, to tightly hold the plates together to keep the diaphragm 42 captured in the frame. In FIG. 14A, one may see to best advantage the diaphragm arch 44 and the notch 45 of the arch 44. In certain embodiments, the frame 48 and arch 44 are aluminum, with a piece/sheet of latex stretched to a desired specification as the diaphragm. Such a diaphragm unit may be the same or similar to the diaphragm that is used in Phelps Game Call's EZBugler™ (https://phelpsgamecalls.com/products/ez-bugler-replacement-amp-reed-2-pack), and/or the same or similar to the diaphragm component of Phelps Game Call's AMP Diaphragm elk call (same website). The diaphragm unit 40 will be understood from the drawings, and further in view of prior patents for diaphragm-based game calls such as Jacobsen U.S. Pat. No. 5,415,578 and Carlton et al. U.S. Pat. No. 10,172,344. In Carlton, for example, the arch frame extending over the top of the diaphragm latex is described as helping keep the Carlton diaphragm in place inside a user's mouth. In the inventors' game call, the diaphragm arch 44 and its proximal edge 43 may extend all the way or nearly all the way to the upper inner surface UIS of the body 12, as described earlier in this document, and may thus also help keep the diaphragm unit 40 in place in the cassette.

As will be understood from FIG. 11 and the drawings of the assembled game call 10, the diaphragm is inserted into the main plate 62 at the aperture, where it rests on the ledge 67 and is generally surrounded by the wall 68 and the cassette arch 63. The cassette 60 is configured in certain embodiments so that it is tight fit to push the cassette into the body, and the cassette arch 63 may guide the cassette through the body and shield the diaphragm unit from being knocked out of the cassette by the forces involved in said pushing of the cassette into the body. During the insertion of the cassette 60 into the body, the resilient body 12 may deform slightly, for example, by the cassette and particularly the cassette arch 63, as they travel thorough the body 12, pushing the upper inner surface UIS of the body 12 slightly away from the longitudinal centerline of the body to make room for the cassette to be fully inserted to its required location in the body 12. When fully inserted, the cassette will seal at its flange and along portions of the cassette to the body interior surface for maintaining proper air flow through the air passageway AP through the body 12 and across the diaphragm 42.

In FIGS. 15-18C:

FIGS. 15-18C show the call body 12, without the diaphragm unit 40 and cassette 60 installed in the body, whereby various portions of the body 12, and especially the tongue TN, are more easily viewed. Reference numbers on FIGS. 15-18C are those used in multiple of FIGS. 1-14, and so will be understood from the drawings and the description earlier in this document.

Referring to FIGS. 19-30C:

An alternative embodiment game call 110 is shown in FIGS. 19-30C, wherein these figures are labeled with the same reference letters and/or reference numbers that add 100 to the reference numbers used in FIGS. 1-18C for the same or similar elements. Much of the description above for FIGS. 1-18C applies to these same or similar elements, and so one may understand game call 110 in view of the above description.

Game call 110 is adapted to have a smaller overall size, and particularly a shorter overall length and smaller width. The handle/cable holder 113 has been moved to the proximal end of the call body 112 so that it does not stick out to the left or right of the body.

To accomplish the shorter overall length of call 110, the body 112 has been shortened compared to call 10, but the diaphragm unit 140 has the same length as unit 40, and may be the same unit 40 as used in call 10. The body 112 and cassette 160 portions distal of the diaphragm unit 140 are much shorter than body 12 and cassette 60, resulting in a shorter air passageway portion distal of the unit 160 and an overall shorter air passageway. The longitudinally and transversely curved tongue TN may be seen in the drawings to extend along about half of the length of the game call 110, for example, 45-65 percent and more preferably 50-65 percent of the length of the game call. This may be compared to the longitudinally and transversely curved tongue TN of call 10 extending along most of the length of the call, for example, 75-100 percent and more preferably 75-95 percent of the length of the game call.

This call 110 has been found to still be an excellent game call capable of the same or similar sounds as call 10. This may be, at least to some extent, to the inhaling-style of using these calls 10, 110, resulting in the distal air chamber and distal end of the calls not controlling the sound to the extent that they do in exhaling-style calls.

As part of the size reduction adaptations for call 110, cassette 160 is adapted to slide entirely, or substantially entirely, into the call body 112, without any end flange (see flange 64 in FIG. 9) extending transversely out and along the proximal end of the call body. Further, cassette 160 includes no cassette arch (see arch 63 in FIG. 11), however, cassette 160 may use the rigid diaphragm arch 144, if necessary, to push the resilient call body slightly out of the way to allow insertion of the cassette 160 into body 112.

Relative Dimensions and Scale:

While not all embodiments and components are limited to having the relative dimensions portrayed in the drawings, the drawings may be considered to be "to scale" so that a viewer may see and even calculate relative dimensions of the components and their parts for certain embodiments.

Benefits of Simplicity:

The preferred embodiments are compact, lightweight, easy to use, and especially beneficial for hands-free use. The preferred embodiments are simple to operate, and they omit some of the more difficult-to-operate complexities of the prior art. The preferred embodiments do not include any handle, plunger, or spring (except for the resilience of the call body and of the diaphragm). The preferred embodiments have only a single reed, for example, a single diaphragm. The preferred embodiments are operated entirely by the inhaling of the user and by adjustment when desired of the pressure of the upper and lower teeth against the call body that is held between them. Certain embodiments may be described as comprising, consisting essentially of, or consisting of, the components portrayed in the drawings. Certain embodiments may include one or more of the components portrayed and/or described herein, for example, one or more but not all the components alone or in combination with other game calls. For example, certain embodiments comprise, consist essentially of, or consist of, a cassette combined with a diaphragm or a diaphragm unit, wherein the cassette and diaphragm/unit combination may be adapted for various styles and configurations of game calls including game calls other than those drawn or described herein.

Exhaling Embodiments:

The preferred embodiments and all the embodiments drawn in the Figures are "inhaling" calls, rather than exhaling calls. These calls have been found by the inventors to be easy to use, and to be capable of producing excellent-quality game call sounds and modulation that are accurate, highly realistic and natural sounds. For example, these inhaling calls may be used to effectively mimic the sounds of a cow elk, which can be high pitched and complex. However, certain alternative embodiments of the invention may use features of the disclosed inhaling call to create an exhaling call. For example, in certain embodiments of an exhaling call, the diaphragm unit 40 could be turned around 180 degrees to face toward the distal end of the call, and the tongue TN could similarly be turned around in the housing for proper engagement of the artificial tongue with the diaphragm. Therefore, included in certain embodiments of this disclosure are the diaphragm and artificial tongue relationship and operation no matter whether the call is an inhaling or exhaling game call.

Although this disclosed technology has been described above with reference to particular means, materials, and embodiments, it is to be understood that the disclosed technology is not limited to these disclosed particulars but extends instead to all equivalents within the broad scope of this disclosure, the drawings, and the claims.

The invention claimed is:

1. A method of using a game call, the method comprising:
providing a game call comprising:
a body having a top side, a bottom side, a right side and a left side and a transverse axis between the right and left sides, an open proximal end and an open distal end and a longitudinal axis between the proximal and distal ends, wherein the body has a hollow interior extending through the call from the proximal end to the distal end; and
a diaphragm inside the hollow interior;
wherein the body is flexible and resilient and further comprises:
a lower interior surface that is transversely curved and longitudinally curved;
a longitudinal air passageway extending between the open proximal end and the open distal end, including between said diaphragm and said lower interior surface;
wherein the method comprises:
placing the proximal end in a user's mouth so that the distal end protrudes from the user's mouth, and inhaling air through the game call into the user's mouth, so that air flows through the air passageway and vibrates the diaphragm to produce game call sounds; and
compressing the game call by applying force against the top and bottom sides, so that the lower interior surface moves toward the diaphragm to modify the produced game call sounds;
wherein the diaphragm is in a frame that is held by a cassette received inside the hollow interior so that the diaphragm is parallel to the longitudinal axis, the diaphragm is attached to the frame on three sides of the diaphragm, and wherein the cassette has a main plate with an aperture, wherein the diaphragm in the frame rests on a ledge of the main plate so that the diaphragm extends over the aperture so that air in the air passageway flows through the aperture and along the diaphragm; and
wherein the method further comprising assembling the game call by resting the diaphragm in the frame on the ledge of the main plate, and inserting the cassette longitudinally into the body through the open proximal end, and wherein the game call further comprises a rigid arch that extends above the diaphragm, the rigid arch being selected from the group consisting of: a portion of the frame that is a rigid frame arch that extends above and across the diaphragm, and a portion of the cassette that is a rigid cassette arch that extends above and across the diaphragm, wherein said rigid arch pushes up against an upper inner surface of the body during said inserting to flex the body so that there is room for the cassette and diaphragm to slide into the body.

2. The method as in claim 1, wherein said compressing the game call by applying force is performed with front upper teeth of the user against the top side and with front bottom teeth of the user against the bottom side.

3. The method as in claim 2, wherein the user increases and decreases the force of the front upper teeth against the top side and the force of the front bottom teeth against the bottom side to decrease and increase, respectively, a distance between the lower interior surface and the diaphragm to modulate the produced game call sounds.

4. The method as in claim 1, wherein the diaphragm inside the hollow interior does not touch any portion of the user's mouth.

5. The method as in claim 1, wherein the method is performed without the user holding the game call in hands of the user during producing the game call sounds.

6. The method as in claim 1, wherein the transversely curved lower interior surface comprises a longitudinal trough forming a portion of the air passageway, wherein the longitudinal trough comprises a central recessed region underneath the diaphragm, and wherein, during said compressing, right and left curvature portions of the lower interior surface underneath the diaphragm contact the diaphragm, and the central recess region underneath the diaphragm does not contact the diaphragm.

7. The method as in claim 1, wherein the right and left curvature portions stretch the diaphragm during contact with the diaphragm.

8. The method as in claim 1, wherein a fourth side of the diaphragm is free from the frame and said fourth side is toward the proximal end of the game call.

9. The method as in claim 1, wherein the produced game call sounds are of tone and pitch adapted for calling cow elk.

* * * * *